United States Patent
Rowe et al.

(10) Patent No.: US 10,296,645 B2
(45) Date of Patent: May 21, 2019

(54) SYSTEMS AND METHODS FOR CONTENT SELECTION BASED ON SEARCH QUERY CORRELATION WITH BROADCAST MEDIA

(71) Applicant: Google LLC., Mountain View, CA (US)

(72) Inventors: Simon Michael Rowe, Finchampstead (GB); John Wedgwood, Seattle, WA (US); Margaret Hollendoner, London (GB)

(73) Assignee: Google LLC, Mountain View, CA (US)

( * ) Notice: Subject to any disclaimer, the term of this patent is extended or adjusted under 35 U.S.C. 154(b) by 854 days.

(21) Appl. No.: 14/622,542

(22) Filed: Feb. 13, 2015

(65) Prior Publication Data

US 2016/0239571 A1   Aug. 18, 2016

(51) Int. Cl.
| | |
|---|---|
| *G06F 7/00* | (2006.01) |
| *G06F 17/30* | (2006.01) |
| *H04N 21/00* | (2011.01) |
| *H04N 21/24* | (2011.01) |
| *H04N 21/25* | (2011.01) |

(52) U.S. Cl.
CPC ....... *G06F 17/30867* (2013.01); *H04N 21/00* (2013.01); *H04N 21/2407* (2013.01); *H04N 21/251* (2013.01)

(58) Field of Classification Search
CPC .............. G06F 17/30867; H04N 21/00; H04N 21/251; H04N 21/2407
USPC ........................................................ 707/732
See application file for complete search history.

(56) References Cited

U.S. PATENT DOCUMENTS

| | | | |
|---|---|---|---|
| 6,493,703 B1* | 12/2002 | Knight | G06F 17/30702 |
| 8,275,764 B2 | 9/2012 | Jeon et al. | |
| 8,775,415 B2 | 7/2014 | Jeon et al. | |
| 2007/0061303 A1* | 3/2007 | Ramer | G06F 17/30864 |
| 2010/0198655 A1* | 8/2010 | Ketchum | G06Q 20/10 |
| | | | 705/14.58 |
| 2012/0084828 A1* | 4/2012 | Rowe | H04N 21/252 |
| | | | 725/110 |

* cited by examiner

*Primary Examiner* — Alex Gofman
*Assistant Examiner* — Michael Le
(74) *Attorney, Agent, or Firm* — Foley & Lardner LLP

(57) ABSTRACT

An audience measurement service may monitor broadcasts in a region, ingesting closed captioning data, metadata, displayed text or logos, performing facial recognition on people, and/or generating audio/video fingerprints of broadcast content to create a database of content and associated keywords, along with times at which the content was broadcast. The audience measurement service may receive user search queries from a search provider and detect "spiking" queries. The audience measurement service may determine whether the spiking queries are related, contextually and temporally, to an item of content identified in the database, and infer that users generating the queries likely viewed the item of content. If or when the media is subsequently rebroadcast, media-related search queries may be detected and corresponding users identified as likely audience members for the rebroadcast, such that they may be targeted to receive additional media-related content.

16 Claims, 9 Drawing Sheets

SYSTEMS AND METHODS FOR CONTENT SELECTION BASED ON SEARCH QUERY CORRELATION WITH BROADCAST MEDIA

BACKGROUND

Audiences for content blocks, such as broadcast media or online streamed media, including commercial advertising, are typically measured via single-source data panels consisting of individuals or households recording content exposure over time. In one typical system, panel members carry a portable pager-sized device with a microphone that listens for embedded sub-audible codes or watermarks in audio of media programs and records the codes it hears, indicating that the panel member was present while the program was being shown or played. The device periodically transmits its logs to a measurement server, which aggregates logs from a plurality of the devices to determine a representative viewership for the program.

At best, panels are only statistically representative of a larger population, and may become very expensive to implement as the panel size is increased in order to reduce statistical error. Additionally, panel compliance is difficult to ensure, as members may fail to carry measurement devices or fill out logs. Finally, in many instances, panel measurement data may be ambiguous to a household, and fail to distinguish between different household members' preferences.

SUMMARY

Frequently upon viewing or listening to items of content in a broadcast, a user may be intrigued and decide to search on the Internet for additional information, such as searches for song lyrics, product information, celebrity sightings, current events, recipes, or any other such information. By correlating content and search queries, it may be possible for an audience measurement service to infer that searchers are likely audience members of the content, through both a contextual relationship (e.g. a search for information corresponding to the item of content) and through a temporal relationship (e.g. a search being made within a few minutes of the item of content being broadcast in the user's geographic region). Additionally, search query information sent by user-specific devices and/or logged-in accounts may be linked to specific individuals in a household. In some implementations, the correlation may not allow generation of raw viewership numbers, as viewership for highly interesting or engaging content may be over-represented (due to increased searches related to the content) while viewership for typical content may be under-represented (as viewers of less interesting content such as the weather or an unamusing sitcom may be less likely to initiate searches related to the content. Accordingly, in such implementations, the audience measurement service may be measuring the relative size of the engaged audience or relative "engagingness" or likelihood of a viewer of the content to become engaged and actively seek additional information.

In one implementation, an audience measurement service may monitor broadcasts in a region, ingesting subtitle or closed captioning data, metadata (if available), identifying displayed text or logos, performing facial recognition on people displayed in the broadcast, and/or generating audio/video fingerprints of broadcast content to create a database of content and associated keywords, along with times at which the content was broadcast. The audience measurement service may receive user search queries from a search provider and detect "spiking" or "surging" queries, or those that have a low baseline query volume but which have large and sudden increases in volume. The audience measurement service may determine whether the spiking queries are related, contextually and temporally, to an item of content identified in the database, and infer that users generating the queries likely viewed the item of content. In some implementations, the audience measurement service may also infer that the users likely viewed other items of content (e.g. advertisements) displayed during the prior or subsequent few minutes on the same broadcast channel as the query-triggering item.

Additionally, identified spiking queries associated with broadcasts may be leveraged to perform predictive audience measurement and content targeting for future rebroadcasts. In practice, many broadcasts of items of content are rebroadcast at a later time, such as in a geographically separated time zone (e.g. prime time broadcasts to an East coast region and subsequent prime time rebroadcasts to a West coast region); in the same region to increase potential viewership (e.g. identical segments shown in early morning news programs and late morning news programs); or for other similar purposes. If a spiking query is identified as associated with an initial broadcast (e.g. temporally and contextually related to the initial broadcast), then if identical queries are subsequently received in close temporal relation to a rebroadcast, the measurement service may infer that users generating the later queries likely viewed the rebroadcast. This inference can be made even before a rate of queries passes a surge threshold during or after the rebroadcast, allowing almost immediate identification of likely audience members. Furthermore, additional content (e.g. advertising, special features, etc.) related to the rebroadcast may be presented to the users, with a high confidence that the additional content will be relevant and well received, with a corresponding increase in offer acceptance or click-through rates.

One implementation disclosed herein is a method for content selection based on search query correlation with broadcast media. The method includes receiving, by a content selection server from a client device at a first time period associated with a rebroadcast of an item of media, a request for an item of content, the request identifying a search query. The method also includes determining, by the content selection server from a log obtained from a search provider, that a rate of receipt of the search query by the search provider during a second time period associated with an earlier broadcast of the item of media exceeded a threshold. The method further includes identifying, by the content selection server, a user of the client device as a likely audience member of the rebroadcast of the item of media, responsive to the determination. The method also includes transmitting, by the content selection server, an identification of an item of content to the client device, the item of content selected responsive to the identification.

In some implementations, the method includes determining that the rate of receipt of the search query during the second time period exceeded a baseline rate of receipt for the search query. In many implementations of the method, the threshold is a multiple of a baseline rate of receipt for the search query. In some implementations, the method includes determining that the rate of receipt of the search query during the second time period exceeded an average rate of receipt for the search query by at least a second threshold. In some implementations of the method, the request comprises a entity associated with the search query in a semantic dictionary.

In some implementations, the method includes generating a confidence score that the user is an audience member, the confidence score based on a difference between a peak rate of receipt of the search query by the search provider during the second time period and a baseline rate of receipt of the search query. In other implementations, the method includes selecting the item of content from an index of items of content associated with the item of media, responsive to the identification that the user of the client device is a likely audience member of the rebroadcast of the item of media.

Another implementation disclosed herein is another method for content selection based on search query correlation with broadcast media. The method includes receiving, by a search provider from a plurality of client devices during a first time period associated with a broadcast of an item of media, a corresponding a plurality of search requests for related entities. The method also includes determining, by the search provider, that a rate of receipt of the search requests for the related entities during the first time period exceeds a threshold. The method further includes receiving, by the search provider from a first client device during a second time period associated with a rebroadcast of the item of media, a search request for at least one of the related entities. The method also includes directing a content selection server to provide an item of content associated with the item of media to the first client device, by the search provider, responsive to (i) the determination that the rate of receipt of the search requests for the related entities during the first time period associated with the broadcast exceeded the threshold, and (ii) the search request being received from the first client device during the second time period associated with the rebroadcast.

In one implementation, the method includes receiving, by the content selection server prior to the second time period, an identification of one or more items of content to be associated with the item of media. In another implementation, the method includes determining a confidence score for an association of the related entities to the item of media, by the search provider, based on a difference between the rate of receipt of the search requests for the related entities during the first time period and a baseline rate of receipt of search requests for the related entities. In a further implementation, the method includes receiving, by the search provider from a second plurality of client devices during the second time period associated with a rebroadcast of the item of media, a corresponding second plurality of search requests for at least one of the related entities; and directing a content selection server to provide an item of content associated with the item of media to a percentage of the second plurality of client devices proportional to the determined confidence score.

In some implementations, the method includes dynamically determining, by the search provider, the threshold as a multiple of a baseline rate of receipt of search requests for the related entities. In many implementations, the related entities are associated in a semantic dictionary.

Another implementation disclosed herein is a system for content selection based on search query correlation with broadcast media. The system includes a content selection server executed by a computing device. The content selection server is configured for receiving, from a client device at a first time period associated with a rebroadcast of an item of media, a request for an item of content, the request identifying a search query. The content selection server is also configured for determining, from a log obtained from a search provider, that a rate of receipt of the search query by the search provider during a second time period associated with an earlier broadcast of the item of media exceeded a threshold. The content selection server is further configured for identifying a user of the client device as a likely audience member of the rebroadcast of the item of media, responsive to the determination, and transmitting an identification of an item of content to the client device, the item of content selected responsive to the identification.

In some implementations, the content selection server is further configured for determining that the rate of receipt of the search query during the second time period exceeded a baseline rate of receipt for the search query. In many implementations of the system, the threshold is a multiple of a baseline rate of receipt for the search query. In some implementations, the content selection server is further configured for determining that the rate of receipt of the search query during the second time period exceeded an average rate of receipt for the search query by at least a second threshold. In many implementations, the request comprises a entity associated with the search query in a semantic dictionary.

In some implementations, the content selection server is further configured for generating a confidence score that the user is an audience member, the confidence score based on a difference between a peak rate of receipt of the search query by the search provider during the second time period and a baseline rate of receipt of the search query. In other implementations, the content selection server is further configured for selecting the item of content from an index of items of content associated with the item of media, responsive to the identification that the user of the client device is a likely audience member of the rebroadcast of the item of media.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Measurement of an audience of content, such as television programming, movies, commercial advertising, or any other type and form of content, may be useful for measuring audience size or popularity of content for pricing and selling advertisement placements, planning content delivery schedules, or other such purposes. In traditional terrestrial or satellite broadcasting, a provider may not have direct knowledge of the number of receivers tuned in at any time, due to the lack of a back channel or communication pathway from the receiver to the provider. To overcome this limitation, some audience measurement systems have used panels of participating individuals who agree to fill out surveys or diaries of content they've seen or listened to. However, this system relies on self-reporting, which may have decreased accuracy. Another system requires panel participants to wear or carry a portable device that detects content played back in the vicinity via sub-audible audio watermarks or codes, and records a log for subsequent transmission to the panel provider. However, this system requires watermarking encoders to be installed at every broadcast source to be measured as part of the signal chain, increasing expense and failure rates. Additionally, embedded codes may be distorted or corrupted when data compression is applied, such as in digital video recorders or other systems.

Figure 1:
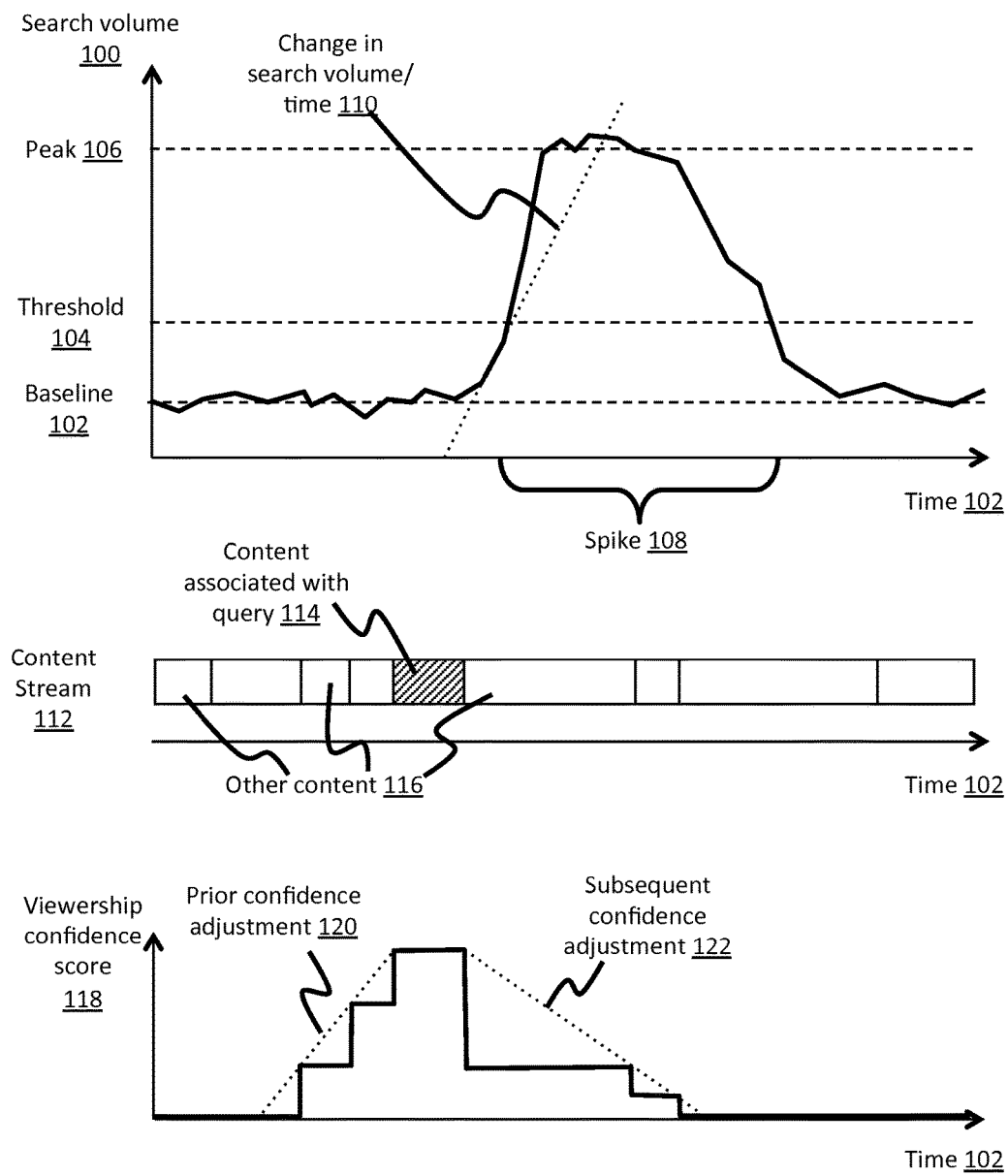
FIG. 1 is an illustration of a relationship between a spiking search query, an item of content within a content stream, and a viewership confidence score, according to one implementation.

Search queries from users may be initiated by their viewership of broadcast content. By correlating content and search queries by both subject or contextual content and temporal relationship, it may be possible for an audience measurement service to infer that searchers are likely audience members of the content. FIG. 1 includes three diagrams illustrating the relationship of spiking search queries to items of content within a content stream and a corresponding viewership confidence score. Referring first to the top diagram of FIG. 1, illustrated is a sample graph of search volume of a query 100 over time 102. Search volume of the query 100 may be a rate of queries received by a search service, such as queries per minute, or by any other such rate or timeframe. Some query volumes may have a relatively low average baseline value 102, particularly queries that are relatively rare. In response to some event, such as display of content related to the query via a broadcast medium, some portion of the viewing public may initiate an Internet search request for the query. This is particularly true with viewers having constant access to the Internet via portable and/or wearable network-connected computing devices. If a large number of viewers initiate search requests for the query within a short span of time after broadcast of the content, the search volume 100 of the query may rise above the baseline 102 for a period of time, identifying a search "spike" 108, sometimes referred to as a search surge, flash mob of requests, trending query, or by other such terms. Spiking queries may be identified when a search volume 100 exceeds a threshold 104 for a period of time; when a search volume 100 reaches a peak 106 above a baseline 102; and/or when the volume of searches increases drastically over a short time frame 110. Thresholds, such as a threshold 104 or a threshold of volume change over time, may be set dynamically or may be configured by an administrator. In one implementation, a threshold 104 may be set to twice the average baseline 102 or any other such value; while in another implementation, a threshold 104 may be set to equal the average baseline 102 plus 50 queries per minute or any other such value.

Referring to the middle illustration of FIG. 1, a content stream 112, such as a terrestrial, satellite, or cable broadcast channel or stream of content may include a plurality of content items 114, 116 over time 102. Content may include television programs, movies, advertisements, documentaries, news programming including breaking news items, music or music videos, talk shows, product descriptions, or a combination of these (e.g. a television show including music in a theme song, and displaying a product during a scene). Content 114, 116 may be of any length, including 30 second commercials and two hour movies. Although only one content stream 112 is illustrated, a plurality of streams of content 112 may be broadcast to any number of recipients in a geographical area or by connection to a common network service, by a plurality of providers. As discussed above, responsive to viewing an item of content 114, some viewers may initiate a search query for information corresponding to the item of content 114, such as a keyword, a product name, an actor or actress name, a song lyric, a geographic location, or any other such information. In some implementations, search queries may be text strings, such as one or more keywords, while in other implementations, search queries may include images or audio recordings.

As shown in the relationship of the top illustration and middle illustration of FIG. 1, responsive to viewing an item of content 114 in a content stream 112, a search service, social network providing a search service, social media site providing a search service, or any other such system providing an interface for users to search for data, referred to generally as a search service or search provider, may receive an increased search volume 100 for a corresponding query or queries, and identify the increased volume as a spike 108. As shown, spikes 108 will typically occur at some point after the item of content 114 is broadcast or after the broadcast of the item 114 begins, as it takes time for viewers to initiate a search request. However, spikes 108 that occur a significant time later may not be associated with broadcast of the item of content 114. Accordingly, in many implementations, a spike 108 may only be associated with a corresponding item of content 114 that was broadcast within a predetermined time period before the spike 108, such as within one minute, 10 minutes, half an hour, or any other such time. In some implementations, the time period may be set responsive to the search volume 100. If a search query is very rare, such as one search per day or less, then a spike of queries 108 may be a rate of one search per hour. Such a spike 108 may be associated with an item of content 114 broadcast up to a day or more previously. However, if the search query is very common (e.g. ten searches per minute), then a spike of queries 108 (e.g. one hundred searches per minute), may be associated with an item of content 114 broadcast only up to a few minutes previously. Similarly, in some implementations, the time period may be set responsive to the frequency of display of the item of content. If an advertisement is broadcast once an hour on some stream 112 of a plurality of streams, then a corresponding spike 108 in search volume may only be associated with the most recent broadcast of the advertisement, or a broadcast of the advertisement within the past ten minutes or other such time period.

Likely viewers of an item of content 114 may be inferred via their initiation of a search query that is part of a spike 108 via a logged-in account on a device or via a user-specific device identifier. A confidence score 118 may be set for the association of the device identifier or user to the item of content 114, as shown in the bottom illustration of FIG. 1. The confidence score for the association of the device identifier or user to the item of content 114 may be set based on the difference between the peak 106 and baseline 102 volumes for the search query, the spike 108 duration, the timing of the user's query within the spike 108, the frequency of spikes 108 for the search query, the frequency of broadcast of the item of content 114, or any combination of these or other such information. A very rare search query with a low baseline 102 that has a spike 108 with a very high peak 106, corresponding to an item of content 114 that is broadcast only very infrequently, may result in a higher confidence score 118 than a very common search query with only a slight spike for an item of content broadcast frequency on one channel or another (e.g. a current top-40 song that may be played several times within minutes on different radio channels in a broadcast region).

Viewers of an item of content 114 will frequently stay tuned to the same channel or content stream 112 for a period of time before or after the broadcast of the item of content 114, at a rate decreasing over time. As illustrated in the bottom graph of FIG. 1, viewership confidence scores 118 may be applied to associations of the device identifier with other content items 116 on the broadcast channel, based on the confidence score for the content 114 corresponding to the spiking search query, at decreasing rates over time. The confidence scores 118 for these other items of content 116 may be adjusted by a prior confidence adjustment rate 120 or subsequent confidence adjustment rate 122, which may be identical or different. Although shown with the confidence score for each item 116 reduced to the lowest amount corresponding to the adjustments 120, 122, in some implementations, confidence scores may be reduced by an intermediate amount, such as to a score corresponding to half the duration of the item 116 at the confidence adjustment rate 120, 122.

Figure 2A:
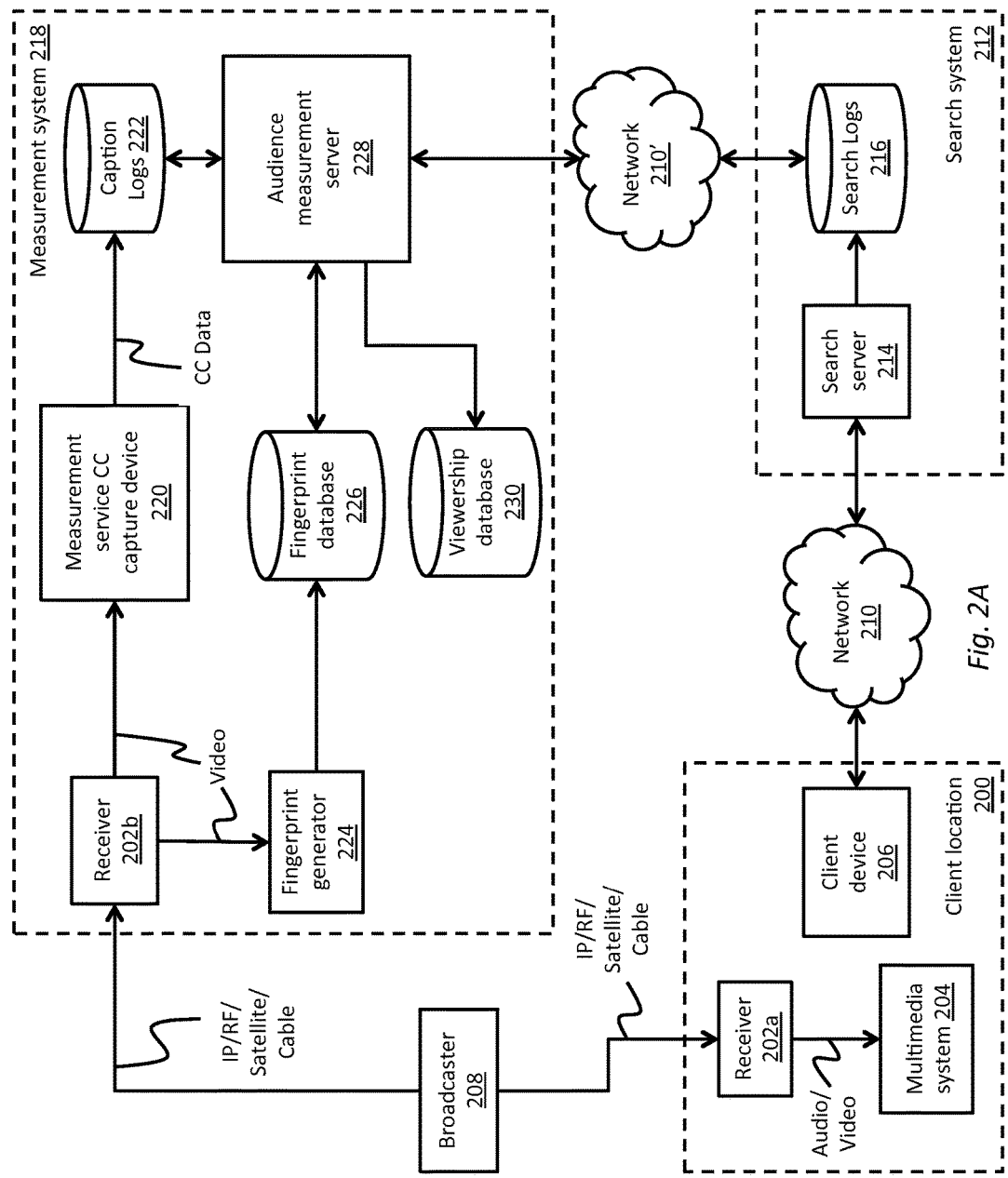
FIG. 2A is a block diagram of a system for audience measurement via spiking search queries, according to one implementation.

FIG. 2A is a diagram of a system for audience measurement, according to one implementation. As shown, a broadcaster 208 may deliver content to client systems at a client location 200 via satellite or terrestrial radio frequency (RF) broadcasts, cable systems, or via Internet protocols (IP) such as streamed or downloaded content, VOD systems, or other such systems. Although shown as a single entity, in many instances, a broadcaster 208 may comprise a broadcast source such as a national broadcast network source, a regional or local network affiliate that receives and redistributes the network source (sometimes with additional local or regional-specific content), a cable broadcast provider, an Internet service provider (ISP), or other various affiliated and non-affiliated entities.

Content may be received by a client system at a receiver 202a, which may comprise an antenna or satellite dish and demodulator or decoder, a cable receiver, a digital television (DTV) decoder, a set top box, a DVR, a computing device, or any other type and form of device for receiving content with closed captioning data. The receiver 202a may be connected to a multimedia system 204, such as a television, home theater system, or any other type and form of device for displaying audio and/or video content received and decoded by a receiver 202a. In some implementations, the receiver 202a and multimedia system 204 may be combined, as in many televisions with attached antennas or included cable demodulators, "smart" or Internet-attached televisions, or other such devices.

A user at a client location 200 may use a client device 206 to transmit a search query or request for information to a search system 212, via a network 210. Search queries may, in many instances, be transmitted responsive to the user viewing an item of content received by a receiver 202a, and accordingly, may correspond both contextually and temporally to an item of content. Client device 206 may be a desktop computer, laptop computer, tablet computer, smart phone, wearable computing device, entertainment or video game console, smart television, set top box, or any other type and form of device capable of transmitting a user generated search query via a network 210 to a search system 212.

Network 210 may be any form of computer network or combinations of networks that relay information between one or more client devices 206, and one or more search servers 214, as well as other devices and systems not illustrated (e.g. web sites, Internet service providers, cable providers, etc.). Network 108 may include the Internet and/or other types of data networks, such as a local area network (LAN), a wide area network (WAN), a cellular network, satellite network, or other types of data networks. Network 210 may also include any number of computing devices (e.g., computer, servers, routers, network switches, etc.) that are configured to receive and/or transmit data within network 210. Network 210 may further include any number of hardwired and/or wireless connections, such that a client device 206 may communicate wirelessly (e.g., via WiFi, cellular, radio, etc.) with a transceiver that is hardwired (e.g., via a fiber optic cable, a CAT5 cable, etc.) to other computing devices in network 210. In some implementations, a network 210 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

Client devices 206 may transmit queries to a search system 212, sometimes referred to as a search provider, Internet search provider, or by similar terms. Search system 212 may include one or more search servers 214, which may be configured in a server farm, cloud, or other network configuration. Search system 212 may receive search queries from client devices 206 and respond with search results in any type or form, such as a website, list, index, or other format. Search queries may include alphanumeric strings or keywords, audio recordings, images, video recordings, or other such information. In many implementations, client devices 206 may transmit an identifier of the device to a search system 212 as part of a search query, or may include a cookie or other identifier received from the search system 212 in response to a prior search query, log in to a service provided by the search system 212 or an associated system, or otherwise obtained by the client device 206 to uniquely identify the client device 206 transmitting the search query and/or the user of the client device 206. Thus, although referred to generally as device identifiers or identifiers of the device, in many implementations, the identifiers may identify a user of the device rather than the device itself. Identifiers may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers, to identify the client device 206. In some implementations, the device identifier may be fixed to the device or preconfigured in the device, such as a manufacturer serial number or MAC address, while in other implementations, the device identifier may be dynamically set by the search service, by the audience measurement server, or other entity, such as via a cookie or username. In some implementations, a unique or new device identifier may be set for each communication to the search server, while in other implementations, the device identifier may not be changed, or may be changed periodically (e.g. hourly, daily, weekly, etc.) or at other intervals (e.g. on restart of the capture device, login to an internet service, etc.). A device identifier may be transmitted to the search server before, with, or subsequent to a transmission of a search query. In one embodiment, a client device may log in or establish an authenticated session with a search service using the device identifier. In another embodiment, the client device may transmit a search query in the body of a packet, with the device identifier included in the header of the packet. Queries may be transmitted via a representational state transfer (REST) protocol, hypertext transfer protocol (HTTP) request (e.g. a POST or GET request with query data as a parameter-value pair), or via any other such application, session, or presentation layer protocol. Search system 212 may store search requests and device identifiers in a search log database 216. In some implementations, requests and device identifiers may be encrypted, hashed, or anonymized to protect privacy of individuals.

Measurement system 218, sometimes referred to as an audience measurement provider, may also receive content streams from a broadcaster 208 or other such identifications of content. In some implementations, a measurement system may include a receiver 202b, which may be similar to a receiver 202a at a client location 200. Receiver 202b may receive content from a broadcaster 208 via terrestrial or satellite broadcast, cable system, Internet, or any other such means, and may output video to a measurement service capture device 220, a fingerprint generator 224, or other such devices. In some implementations, a receiver 202b may be in the same geographical region as a receiver 202a. In one such implementation, at least one receiver 202b may be deployed in major cities or broadcast markets to capture the broadcasts from a local broadcaster 208. In other implementations, a receiver 202b may be deployed elsewhere, and may receive a similar, but different broadcast. A receiver 202b may receive a national network broadcast via a cable system, while a receiver 202a may receive a terrestrial broadcast from a local affiliate of the national network broadcaster. Such local affiliate broadcasts may include similar content, but may have different interstitial advertising, local newscasts, or other inserted or modified content. Although only one receiver 202b is illustrated, in some implementations, a plurality of receivers 202b may be deployed at a location; e.g. one per broadcaster to be measured. In other implementations, a receiver 202b may have a plurality of tuners, demodulators, or sub-receivers and may be able to receive and output a plurality of broadcasts simultaneously to a corresponding plurality of measurement service capture devices 220 and/or fingerprint generators 224.

Federal Communications Commission (FCC) regulations require all United States broadcasters to provide closed captioning for television programs. In analog television broadcasts compliant with National Television System Committee (NTSC) standards, closed captioning is encoded into line 21 of the vertical blanking interval in EIA-608 format, developed by the Electronic Industries Alliance (EIA), and frequently referred to as "line 21 captioning". For digital television broadcasts compliant with Advanced Television System Committee (ATSC) standards, closed captioning is provided via three encoded streams, two of which provide backward compatibility with NTSC decoders, the third providing up to 63 additional captioning streams encoded in EIA-708 format (sometimes referred to as "CEA-708" format). As the closed captioning is content-specific, the encoded text may be used to identify specific programs being watched by a viewer, and accordingly may be used for audience measurement via the systems and methods disclosed herein. Because each broadcaster already is generating and embedding the captioning, these systems and methods do not require any additional encoders to be installed at stations or cable providers. Many other countries require similar embedding of close captioning or subtitle data, or closed captioning may be provided by a private entity, that may be used in a similar fashion (e.g. subtitle requirements promulgated by the Office of Communications (Ofcom) in the United Kingdom; Red Bee Media in Australia; etc.).

A capture device 220 may receive the NTSC/ATSC/DVB and/or ISDB video signal from a receiver 202b (e.g. cable or HDTV decoder, set top box, digital video recorder (DVR), receiver, television output, or other such source). The capture device 220 may decode the closed captioning signal (e.g. the encoded line 21 signal and/or embedded EIA-708 streams), for generation of a database of closed captioning text 222. The database may be populated via one or more capture devices 220 receiving local or national broadcast signals, or with data separately provided by broadcasters (e.g. metadata, text files, ancillary data, or other such transmissions).

Although shown grouped in a measurement system, in some implementations, a receiver 202b need not be located in geographic proximity to a measurement service capture device 220 and/or an audience measurement server 228. In such implementations, a receiver 202b may communicate with a measurement service capture device 220 via a network 210, such as the Internet; and/or a measurement service capture device 220 may communicate via a network 210 with an audience measurement server 228. In one implementation, a receiver 202b and/or measurement service capture device 220 may be deployed at a broadcast transmission site or studio and receive a pre-transmitter video feed or a feed from a monitoring receiver at the site or studio, and may transmit decoded closed captioning data or logs 222 to the audience measurement server 228 via a network 210.

As discussed above, in some implementations, a measurement system may include a database or storage device 222 storing closed captioning data, referred to generally as a caption logs 222. Closed captioning data for the database 222 may be received from the measurement service capture device 220, or may be received directly from a broadcaster 208. In one implementation, closed captioning data may be intercepted before encoding in the video signal and/or decoded via a monitoring output at a broadcast site or studio, and may be transmitted via a network 210 for storage in a closed captioning database 222. In a similar implementation, closed captioning data may be provided in non-real-time from the broadcaster 208 for inclusion in a closed captioning database 222. In one implementation, the broadcaster 208 may separately provide text or data files of closed captioning data to be embedded in a video signal during broadcast of a movie or television program, sometimes hours, days, or weeks in advance of broadcast. Similarly, the broadcaster 208 may provide text or data files of closed captioning data for one or more items of content in a VOD library.

Although shown separate from audience measurement server 228, in many implementations, closed captioning data 222 may be part of the audience measurement server 228 or maintained by the audience measurement server 228. Accordingly, in such implementations, the audience measurement server 228 may receive closed captioning data from broadcaster(s) 208 and/or measurement service capture device(s) 220 and may store the data in the closed captioning database 222.

Closed captioning database 222 may comprise a relational database, flat file, data file, or any other type and form of database. In some implementations, closed captioning text may be stored in the database 222 as text. In other implementations, a portion of closed captioning text (e.g. a number of words or characters, such as 5 words, 8 words, 10 words, 50 words, or any other such value; an amount of data in a number of video fields, such as closed captioning data from one video field, 10 video fields, or any other such value; or an amount of data within a predetermined period of time, such as closed captioning data embedded within 5 seconds of video, 10 seconds of video, or any other such value) may be hashed or used as an input to a hashing algorithm, with the result entered into the database or used as an index to an entry in the database. Closed captioning database 222 may also include an identification of an item of content associated with the closed captioning data or portion of the closed captioning data. In implementations in which closed captioning data is received in non-real-time from a broadcaster, the data may be explicitly identified as associated with an item of content. In other implementations in which closed captioning data is received via a receiver 202*b* and decoded by a measurement service capture device 222, the data may be associated with an item of content based on a broadcast schedule, embedded metadata, or other such information. In still other implementations, the data may be associated with a channel and broadcast time that the content was received by a receiver 202*b*, and may be subsequently associated with the item of content based on a broadcast schedule, such as during a subsequent step of audience measurement.

An audience measurement system 218 may also include one or more fingerprint generators 224. Fingerprint generators 224 may include hardware and/or software for identifying items of content and/or advertising provided by a broadcaster 208 as part of a broadcast content stream. In some implementations, fingerprint generators 224 may generate audio and/or video fingerprints of content items by sampling audio and/or video data of the content items and calculating a hash of the resulting audio and/or video data, by decimating the audio and/or video data (e.g. by removing nine out of ten samples) and hashing the decimated data, by calculating a convolution of the audio data against the video data, or otherwise creating a unique identifier for an item of content. Fingerprints may be stored in a fingerprint database 226 and compared against other fingerprints, to identify if a content item was previously provided in the same or a different broadcast stream. The same advertisement may be provided by a broadcaster 208 on multiple channels at different times, or a popular song may be played on multiple radio stations in a market at different times. Fingerprinting the audio and/or video of such content may allow aggregated measurements of audience of the content, as well as disambiguating search spikes to different instances of broadcast of the content. In some implementations, fingerprints for content, such as advertisements, may be pre-generated or added to a fingerprint database 226. The fingerprint generator 224 may receive incoming audio or video and compare a fingerprint generated for the audio or video to fingerprints in the database 226. A match may allow the measurement system 218 to recognize that a specific item of known content, such as an advertisement, is being broadcast. The measurement system 218 may add an identification to a database 234 to indicate that the known content was broadcast on a specified channel at a specified time.

An audience measurement system may include one or more audience measurement servers 228. Audience measurement servers 228 may include one or more computing devices, servers, desktop computers, rack mount computers, workstations, or other devices for receiving search logs 216 from search systems 212 (such as via a network 210', similar to or the same as network 210), for identifying spiking queries within the search logs 216, and for correlating spiking queries with items of content based on caption logs 222 and/or fingerprints 226. In some embodiments, an audience measurement server 228 may be a virtual machine or machines executed by one or more physical machines, such as in a cloud service or server farm. Audience measurement servers 228 may be located in proximity to measurement service capture devices 220, or may be remote from one or more measurement service capture devices 220 and may communicate with the devices over a network 210.

The measurement server 228 may receive search logs 216 from a search system 212 via a network 210'. As discussed above, search logs 216 may include identifications of searches and corresponding device identifiers or anonymized device identifiers. In some implementations, searches may be aggregated by a search system into a set of device identifiers that provided a particular query within a specified time period (e.g. all device identifiers that transmitted a search for "x" within a ten second time period). This may reduce the bandwidth and storage required for the search logs 216 for particularly popular search queries. Search logs or spiking query data may be provided on a push or request-response basis in various implementations.

In some implementations, the audience measurement server 228 may receive the entire search log 216 and identify or extract spiking queries, while in other implementations the search system 212 may identify spiking queries and transmit log data only for such queries to the audience measurement server 228. In some implementations and as discussed above in connection with FIG. 1, spiking queries may be identified by identifying a baseline search rate for the query (e.g. one query per ten minutes), and identifying a time period (e.g. surge or spike) with an elevated search rate for the query or elevated rate of change of searches for the query. In some implementations, spiking queries may be identified responsive to a search rate for the query exceeding a threshold. The threshold may be set dynamically based on the baseline rate such as double or triple the baseline rate, or equal to the baseline rate plus a value over a specified time period. In other implementations, spiking queries may be identified based on the rate of change of the search rate or change in search volume over time (dV/dT) exceeding a threshold (e.g. a volume of 10 queries per second increasing by 1 query per second, per second).

In some implementations, a spiking query may include several different, but related search queries. The audience measurement server 228 and/or search system 212 may identify queries as related via a semantic dictionary or map of queries (e.g. keywords, images, sounds, etc.) to categories. In one such implementation, an image of an actor may be related in a semantic map to the actor's name, a set of movies or television shows that the actor has appeared in, a set of products the actor has advertised, etc. Responsive to display of an item of content (e.g. one such television show) including the actor, search requests for any the related queries may be identified as a spiking query for the semantic category. In another implementation, each word in a song lyric may be mapped to the song, allowing user searches for any subset of the lyrics to be counted for the purposes of detecting a spiking query for the song responsive to the song being played on a local radio station. Semantic mappings may also be applied to caption logs 222 and/or fingerprint database 226 such that the audience measurement server 228 may identify related items of content based on any correspondingly mapped query.

As discussed above, once a spiking query has been identified, the audience measurement server 228 may determine whether an item of content has been broadcast within a predetermined period of time before the spike. The measurement server 228 may search for queries (or semantically mapped categories and/or category-related queries) within caption logs 222 and/or fingerprint database 226. In other implementations, as discussed above, the fingerprint database 226 may contain fingerprints and identifications of known items of content, such as advertisements or other such content. The measurement server 228 may compare signatures generated for incoming live audio or video to previously stored fingerprints to recognize that a specific item of known content, such as an advertisement, is being broadcast. The measurement system 218 may add an identification to an entity database 234. Upon identifying a spiking query, the measurement system 218 may search the database to for corresponding entities (such as for keywords related to a specific advertisement) and may determine whether the advertisement was broadcast within a predetermined window or period of time (e.g. 3 minutes) prior to the time of the query spike. If so, the measurement server 228 may infer that devices that transmitted the corresponding queries had users that likely viewed the broadcast entity or content. In some implementations, the measurement server 228 may use a search algorithm for a text string in caption logs 222 including the received text. In implementations in which the captioning data is hashed or stored in hashed form in the database, as discussed above, the measurement server 228 may determine if an entry exists in the database at an index identified by the hash calculation value, such that existence of such entry (with an associated identification of a content) indicates that the spiking query matches data received from a measurement service capture device 220 or from a broadcaster 208.

To further increase uniqueness of closed captioning strings associated with content, older content or closed captioning data may be removed from the database 222. Many broadcast programs are presented daily or weekly (e.g. nightly newscasts or episodic sitcoms with identical introductions, etc.). Closed captioning data from these programs may be removed from the database 222 after a corresponding time period of a day or week, eliminating the possibility of spiking queries matching both a current presentation and a previous presentation of the same program. In other implementations, content or closed captioning data may be associated with a broadcast time, and spiking queries may be compared against entities in the database from within a predetermined period of time before the spike (e.g. up to 3 minutes). Use of short comparison windows may increase confidence that broadcast of the associated entity was the trigger for the spike. Older caption or content data may be retained for comparison to historical search logs.

If the measurement server 228 identifies a matching fingerprint or caption log entry, or identifies that an item of content corresponding to the fingerprint or caption was broadcast by a broadcaster 208 within a predetermined time period, then the measurement server 228 may determine that queries received during the spike were initiated by a user viewing the content item. Responsive to the determination, the measurement server may add device identifiers associated with the corresponding queries to an entry in a viewership database 230 for the item of content. As discussed above, in some implementations, the measurement server may add a confidence score or measure to the viewership database for each device identifier. The confidence score may be based on the peak volume of the search above a baseline volume, the frequency of searches for the query, the frequency of broadcast of the item of content, or any other such information or combination of information. In some implementations, the measurement server may also add the device identifiers to entries in the database 230 for other items of content broadcast on the same medium and channel immediately prior to and subsequent to the broadcast of the item of content associated with the spiking query. The measurement server may further add confidence scores for the other items of content for each device identifier, said confidence scores reduced based on a prior and subsequent confidence score adjustment factor, as discussed above in connection with FIG. 1.

In some implementations, prior to adding device identifiers to viewership database 230, the measurement server 228 and/or the search system 212 may extract a subset of device identifiers of devices known to be in the geographic broadcast region of the broadcaster 208 that provided the item of content identified via caption logs 222 or fingerprint database 226. This may allow disambiguation between users that initiated the query after viewing the item of content, and other users who are in a different broadcast region and coincidentally initiated a similar query at a similar time. In such implementations, the search system 212 may receive location information from a client device 206 either with the search request or during a previous interaction with the search system 212 (e.g. on log-in to an associated service, with a previous search request, etc.). In other implementations, device identifiers may be excluded from the subset to be added to viewership database 230 based on broadcast method (e.g. device identifiers of users who have informed the measurement system and/or search system that they do not own a television may not be included in database 230 entries associated with items of content that were broadcast, but may be included in database 230 entries associated with items of content that were streamed via the Internet).

Figure 2B:
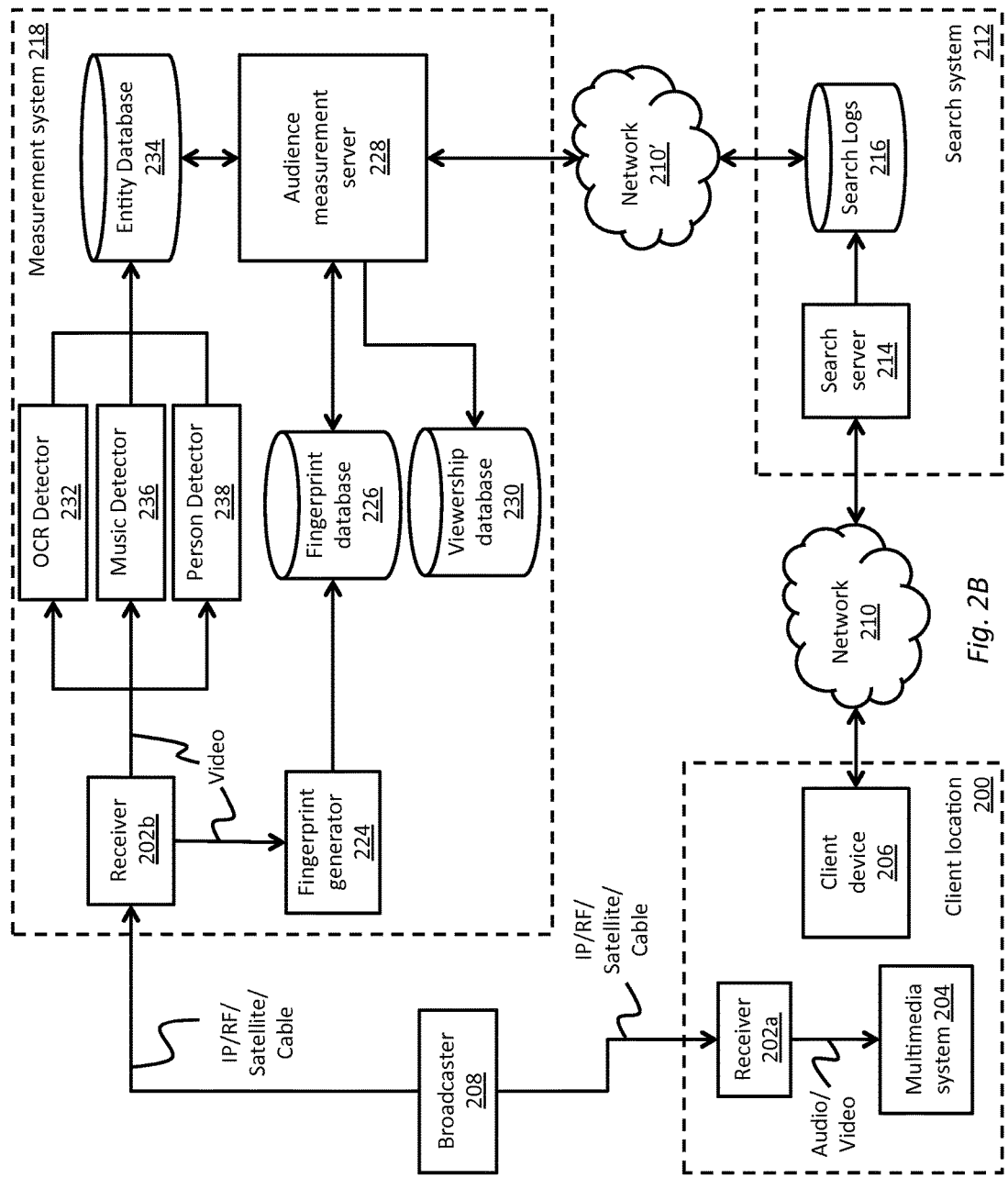
FIG. 2B is a block diagram of another system for audience measurement via spiking search queries, according to one implementation.

Referring briefly to FIG. 2B, illustrated is a block diagram of an audience measurement system in a similar implementation to that of FIG. 2A. As shown, in addition to or in place of a measurement service capture device 220 that extracts closed captioning data, a measurement system may include an optical character recognition (OCR) detector 232, a music detector 236, and/or a person detector 238, referred to generally as entity detectors. An OCR detector 232, sometimes referred to as a screen scraper or text analyzer may identify text in a video signal and extract the words displayed. This may be helpful for extracting product, place, or business names from a broadcast image. Extracted text may be added to an entity database 234 and associated with a broadcast item of content (e.g. channel and time). In a similar embodiment, the OCR detector 232 or another screen scraper may identify product logos or trademarks, product images, or other such features, and may add corresponding identifications (e.g. received from an image searching system) to the entity database 234. In another similar embodiment, the measurement system 218 may include a speech-to-text engine (not illustrated), which may automatically transcribe input audio including spoken words from a broadcast.

Similarly, a music detector 236 may monitor a broadcast for music (e.g. theme songs, audio of music videos, radio music broadcasts, etc.) and extract a signature of the music. The signature may be transmitted to a search system 212 and/or music matching service, which may respond with an identification of the song, artist, album, lyrics, or other such information. These identifications may be added to the entity database 234 and associated with the broadcast item of content.

Likewise, a person detector 238 may monitor a video broadcast and detect faces appearing in the video. The person detector 238 may generate a facial recognition signature for a detected face (e.g. via principal component analysis using eigenfaces, linear discriminate analysis, elastic bunch graph matching, or any other such recognition system), and may transmit a signature query to a search system 212 and/or facial recognition service, which may respond with an identification of the corresponding actor, actress, celebrity, or other such person. The identification may be added to the entity database 234 and associated with the broadcast item of content.

According, in some such implementations, text (e.g. displayed on screen or in closed captioning data), audio, facial images, logos, metadata, or other such information or identification entities may be added to database 234 and associated with the broadcast item of content, time, and/or channel, for matching with spiking queries as discussed above.

Figure 2C:
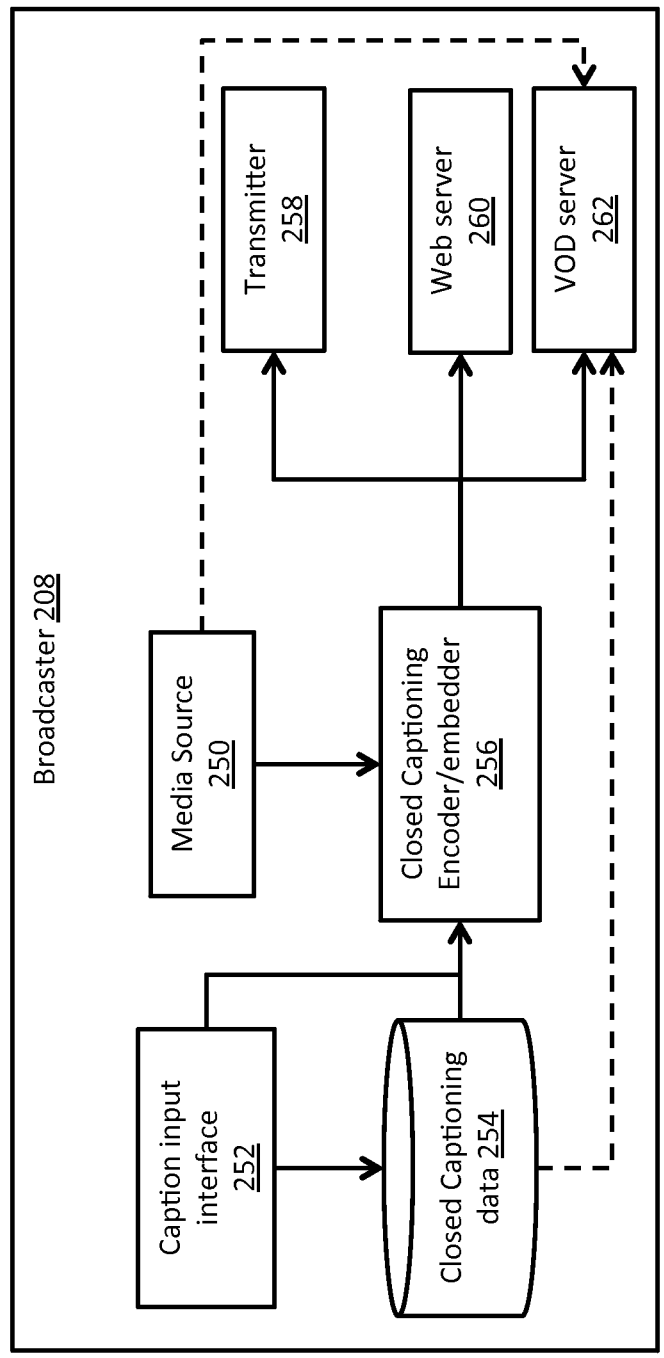
FIG. 2C is a block diagram of a broadcast provider system, according to one implementation.

FIG. 2C is a block diagram of a broadcast provider system, according to one implementation. As shown, a broadcaster 208 may include one or more media sources 250. Although only one media source is illustrated, it may be readily appreciated that typical broadcasters 208 may include multiple studios, media play out sources, satellite downlinks, or other equipment, which may be mixed or selected via a mixer, router, switch, or other interface and provided to a closed captioning encoder or embedder 256, referred to generally as an encoder 256.

As discussed above, encoders 256 may receive closed captioning data from one or more sources, such as a caption input interface 252 and/or a closed captioning data file 254, and may encode or embed the data in EIA-608 and/or EIA-708 format or other similar formats. Closed captioning may be inserted for live programming, such as live sports or news broadcast events via input interfaces 252 (e.g. computing devices, keyboards, text-to-speech converters, etc.); or may be provided by program producers or third-party services for pre-recorded content, such as movies or television programs. Closed captioning data files 254 may be sent to an encoder 256 via automation or other systems for synchronized embedding during playback for on-air broadcasting.

In some implementations, output of an encoder 256 may be provided to a transmitter 258, such as a satellite transmitter, terrestrial transmitter, microwave transmitter, or cable modulator; may be provided to a web server 260 for streamed broadcasting; and/or may be provided to a VOD server 262 for transfer to a client responsive to a request. In some implementations, media content from a source 250 and closed captioning data 254 may be provided separately to a VOD server 262, without embedding, or for embedding via a client-side interface.

Figure 3A:
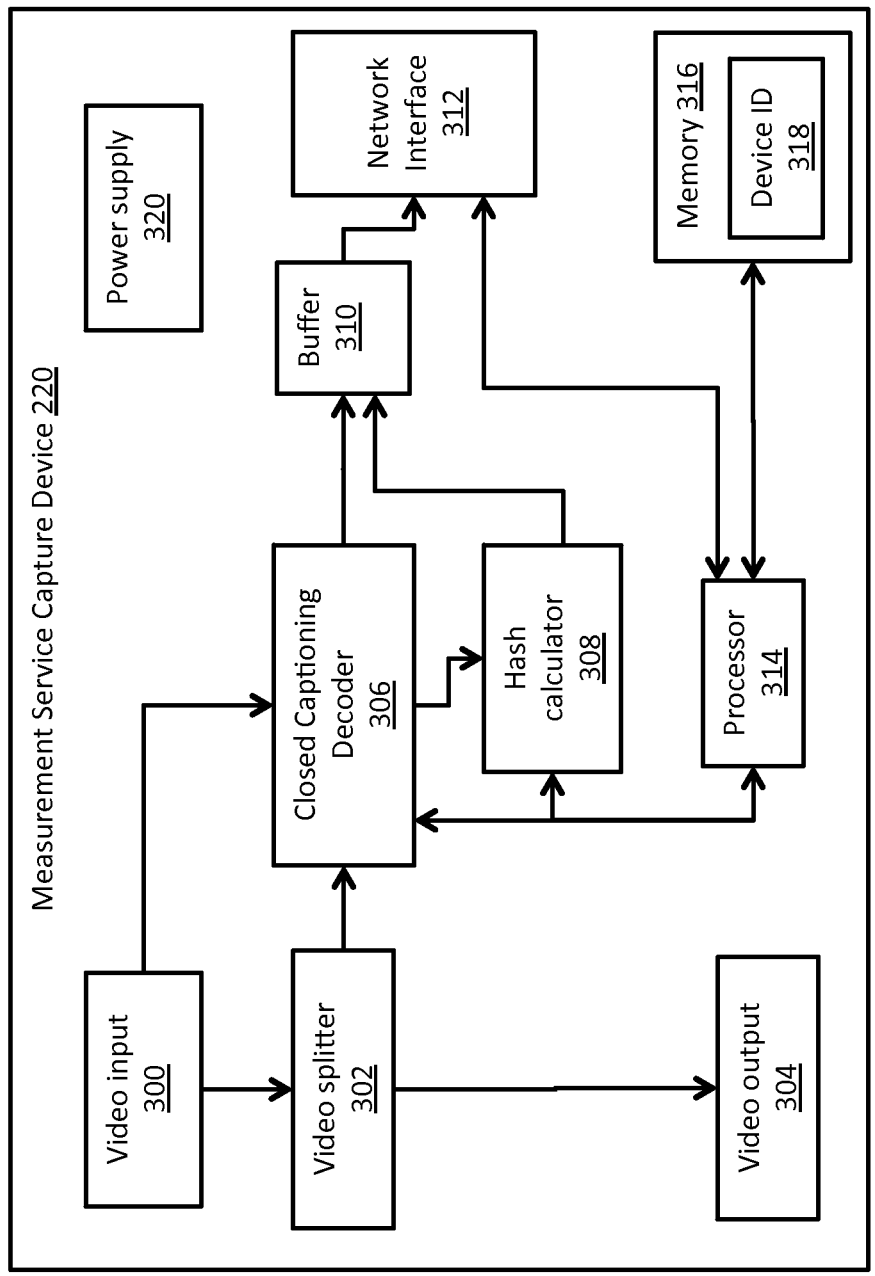
FIG. 3A is a block diagram of a measurement service capture device, according to one implementation.

FIG. 3A is a block diagram of a closed captioning capture device, such as a measurement service capture device 220, according to one implementation. A capture device 220 may include a video input 300. Video input 300 may be any type and form of video input, including an analog composite or component video input, a baseband or RF video input, a digital video input, or any other type of input. In some implementations, a capture device 220 may include a video splitter 302 and a video output 304. In one such implementation, the capture device 220 may be deployed as an intermediary device between a video output of a receiver and a video input of a television or other display or between a receiver and a fingerprint generator 224. Accordingly, the capture device 220 may include a video input 300 for connection to the receiver, video splitter 302 for splitting the input signal for processing by a closed captioning decoder 306, and video output 304 for connection other devices. In other implementations, the capture device may not include a video splitter 302 and video output 304.

The output of video input 300 or video splitter 302 may be provided to a closed captioning decoder 306, referred to generally as a decoder 306. Decoder 306 may comprise hardware, software, or a combination of hardware and software. In one implementation, decoder 306 may comprise a CMOS integrated circuit (IC), such as a MC144144 series IC manufactured by Motorola Inc. of Schaumburg, Ill. or an equivalent IC; a programmable IC or field-programmable gate array (FPGA); or any other type and form of circuit or combination of circuits. In another implementation, the capture device 220 may include a processor 314 and memory device 316, and may execute a software decoder 306, which may read a digital input or output of an analog-to-digital converter connected to video input 300.

Decoder 306 may output one or more strings of closed captioning data. EIA-608 allows for four channels of information. In some implementations, decoder 306 may output a plurality of these channels, while in other implementations, decoder 306 may output a single channel or be selectively set to output a single channel. Similarly, EIA-708 allows for 63 channels plus two backwards-compatible EIA-608 channels, and decoder 306 may be set to output one or more of the embedded channels.

In some implementations, capture device 220 may include a hash calculator 308. Hash calculator 308 may comprise hardware, software, or a combination of hardware and software for performing a hashing calculation on a string of output data from closed captioning decoder 306. Hash calculator 308 may comprise an IC, PIC, FPGA, or other hardware programmed to perform a cryptographic or non-cryptographic hashing function, such as a message-digest algorithm (MD) hash (e.g. MD2, MD4, MD5, MD6, etc.), secure hash algorithm (SHA) hash, or any other type and form of hashing function. In other implementations, a hash calculator 308 may comprise a software algorithm, stored in memory 316 and executed by a processor 314 on an output of a decoder 306. As discussed above, a hash calculator 306 may perform a hashing calculation on any number of characters or words, and may utilize a sliding window to perform hashing calculations on overlapping data sets output from a decoder 306.

In some implementations, an output of decoder 306 and/or hash calculator 308 may be buffered in a buffer 310, such as a First-in/First-out (FIFO) buffer, ring buffer, or similar memory structure. As a single field of closed captioning data may be just a few words or characters, it may be more efficient to collect a few kilobytes or more of closed captioning data and/or hash calculation results before transmitting data over a network or writing data to a log or entity databsae. Accordingly, in such implementations, data may be buffered in buffer 310 for a predetermined period of time or a predetermined amount of data may be buffered for subsequent transmission.

In some implementations, an output of a buffer 310, and/or decoder 306 or hash calculator 308, may be transmitted or streamed via a network interface 312 to an audience measurement server and/or entity database 234 or caption log 222. A network interface 312 may comprise any type and form of network interface, including a wired interface (e.g. Ethernet, including 10 Base T, 100 Base T, or 1000 Base T ("Gigabit")), a wireless interface (e.g. 802.11a, 802.11b, 802.11g, 802.11n, 802.11.ac, Bluetooth, Bluetooth Low Energy, Near-field Communication (NFC)), a cellular interface, or any other type of interface for transmitting data over a network. In some implementations, network interface 312 may comprise a parallel or serial interface, such as a USB interface, an IEEE 1394 (Firewire) interface, an RS-232 interface, an RS-485 interface, or any other type and form of interface to another computing device. In many implementations, a second computing device may serve as an intermediary for communications to an audience measurement server. In one such implementation, a capture device may communicate via a USB interface with a desktop computer, which may transmit captured closed captioning data via an Ethernet interface to a network gateway or switch connected to the Internet for transmission to an audience measurement server. In such implementations, network interface 312 may be referred to as a communications interface. In some implementations, the capture device 220 may store decoded and/or hashed data in a memory 316, for subsequent synchronization or transfer via a computing device connected to a network 210.

As discussed above, in many implementations, a capture device 220 may include a processor 314. Processor 314 may comprise any type and form of processing unit, including a microprocessor, application-specific integrated circuit (ASIC), FPGA, etc., or combinations of these or other processing units. In many implementations, processor 314 may be a multi-core processor or an array of processors. A capture device 220 may also include memory 316, which may include, but is not limited to, electronic, optical, magnetic, or any other storage devices capable of providing processor 314 with program instructions. Memory 316 may include a floppy disk, CD-ROM, DVD, magnetic disk, memory chip, ROM, RAM, EEPROM, EPROM, flash memory, optical media, or any other suitable memory from which processor 314 can read instructions and, in some implementations, to which processor 314 can write decoded or hashed closed captioning data for subsequent transmission via network interface 312. The instructions may include code from any suitable computer programming language such as, but not limited to, C, C++, C#, Java, JavaScript, Perl, HTML, XML, Python and Visual Basic.

In some implementations, a capture device 220 may include a device identifier 318. Device identifier 318 may be an alphanumeric string, data string, serial number, MAC address, IP address, username or account name, GUID, cookie, random or pseudorandom number, or any other type and form of identifier, including combinations of these or other identifiers, to identify the capture device 220. In some implementations, the device identifier 318 may be fixed to the device or preconfigured in the device, such as a manufacturer serial number or MAC address, while in other implementations, the device identifier 318 may be dynamically set by a panel provider, by the audience measurement server, or other entity, such as via a cookie or username. In some implementations, a unique or new device identifier 318 may be set for each communication to the audience measurement server, while in other implementations, the device identifier 318 may not be changed, or may be changed periodically (e.g. hourly, daily, weekly, etc.) or at other intervals (e.g. on restart of the capture device, login to an internet service, etc.). Device identifier 318 may be transmitted to the audience measurement server before, with, or subsequent to a transfer of decoded and/or hashed closed captioning data, such that the data may be identified as having been captured by the device 220. In one embodiment, a capture device 220 may log in or establish an authenticated session with an audience measurement server using the device identifier 318. In another embodiment, the capture device 220 may transmit closed captioning data in the body of a packet, with the device identifier included in the header of the packet. Closed captioning data may be transmitted via a RESTful protocol, HTTP request (e.g. a POST or GET request with captioning data as a parameter-value pair), or via any other such application, session, or presentation layer protocol. In other implementations, closed captioning data may be transmitted via an options field of a transport layer protocol packet header, such as a TCP or UDP packet. In other implementations, closed captioning data may be provided as a serial bit stream.

In some implementations, a capture device 220 may include a power supply 320. Power supply 320 may comprise a battery, AC power supply, DC power supply, USB power supply, Power-over-Ethernet (PoE) power supply, inductive power supply, or any other type and form of power supply. Although illustrated internal to a capture device 220, in many implementations, a power supply 320 may be external from device 220, such as an external AC-to-DC converter.

Figure 3B:
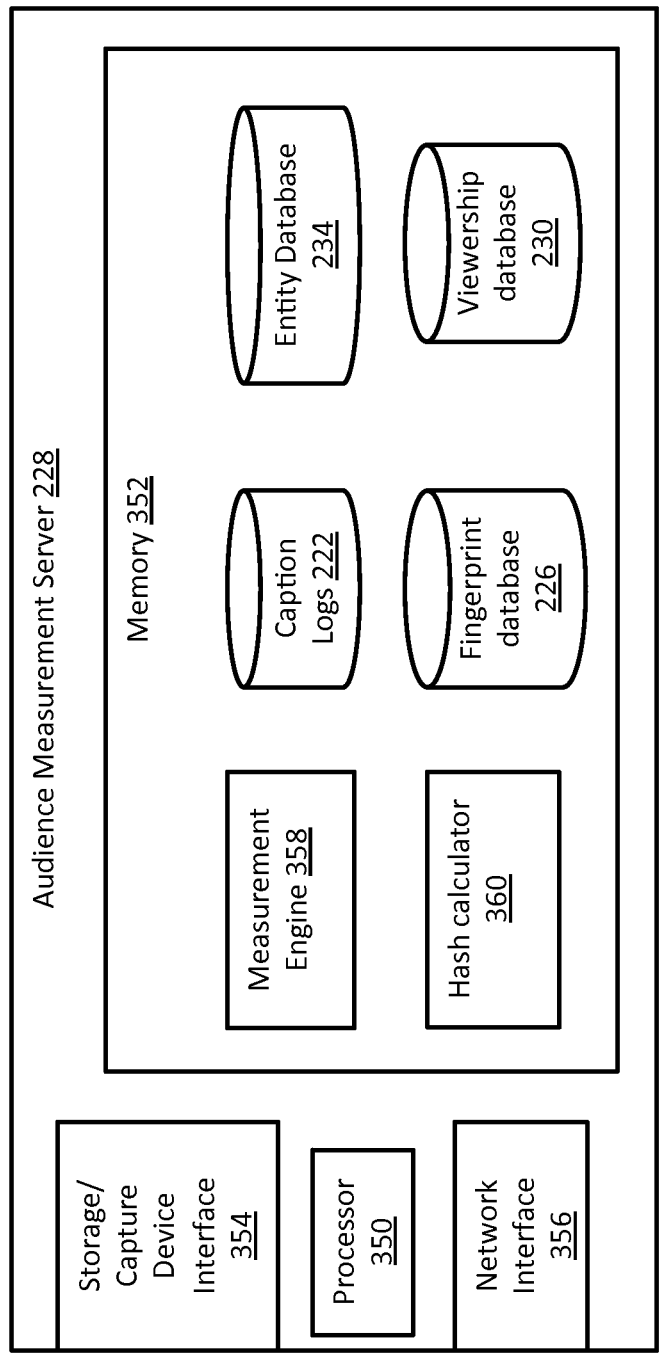
FIG. 3B is a block diagram of an audience measurement server, according to one implementation.

FIG. 3B is a block diagram of an audience measurement server 228, according to one implementation. In many implementations as discussed above, audience measurement server 228 may comprise a plurality of devices connected via a network, such as a server farm or cluster or a cloud of devices. In other implementations, one or more audience measurement servers 228 may comprise a virtual machine executed by a physical machine. Accordingly, in such implementations, audience measurement server 228 may comprise one or more of each of interfaces, memory, and processors 350-356.

An audience measurement server 228 may include one or more storage device or capture device interfaces 354, and one or more network interfaces 356. As discussed above, in many implementations, a capture device 220 may communicate with an audience measurement server 228 via a network 210 to a network interface 356. Network interface 356 may comprise any type and form of network interface, such as a wired interface (e.g. Ethernet), a wireless interface (e.g. 802.11a, 802.11b, 802.11g, 802.11n, 802.11.ac, Bluetooth, Bluetooth Low Energy, NFC interface, etc.), a cellular interface, or any other type of interface for receiving data from capture devices 220. Network interface 356 may also be used for communicating with a search service and/or for receiving search logs or logs for spiking queries from a search service. In some implementations, network interface 356 may also be used for providing music or facial recognition data to a music matching service or facial recognition database service and for receiving identifications of matching entities.

In many implementations, as discussed above, an audience measurement server 228 may be deployed locally to an audience measurement capture device 220. In such implementations, the capture device may connect via a network interface 356, or via a capture device interface 354, including a parallel or serial interface, such as a USB interface, an IEEE 1394 (Firewire) interface, an RS-232 interface, an RS-485 interface, or any other type and form of interface. In many implementations, an audience measurement server 228 may connect to one or more storage devices, such as hard drives, flash drives, redundant arrays of independent disks (RAID arrays), network attached storage (NAS) devices, storage area network (SAN) devices, or any other type and form of storage. Such storage devices may store closed captioning data 222, as discussed above, received from one or more broadcasters 208, one or more audience measurement capture devices 220, or other data. Storage devices may also store an entity database 234, a fingerprint database, a viewership database 230, and/or audience measurement data, discussed in more detail below.

An audience measurement server 228 may include one or more processors 350, including one or more microprocessors, ASIC circuits, FPGAs, etc., or combinations of these or other processing units. In many implementations, processor 350 may be a multi-core processor or an array of processors. In other implementations, a processor 350 may comprise a virtual processor executed by a physical processor. Processor 350 may be configured for executing a measurement engine 358 and/or hash calculator 360, as well as for communicating with capture devices 220 and/or storage devices via network interface 356 and capture device interface 354.

An audience measurement server 228 may also include memory 352, which may include, but is not limited to, electronic, optical, magnetic, or any other storage devices capable of providing processor 350 with program instructions. Memory 352 may include a floppy disk, CD-ROM, DVD, magnetic disk, memory chip, ROM, RAM, EEPROM, EPROM, flash memory, optical media, or any other suitable memory from which processor 350 can read instructions and to which processor 350 can write data. As shown, in some implementations, a closed captioning database 220, an entity database 234, a fingerprint database, and/or a viewership database 230 may be stored in memory 352 rather than an external storage device.

Memory 264 may include a measurement engine 358. Measurement engine 358 may comprise an application, service, server, daemon, routine, subroutine, or other executable logic for identifying spiking queries via identification of baseline query volumes and comparison of volumes to thresholds or comparison of volume change rates to thresholds and/or for comparing spiking queries to a closed captioning or entity database to identify items of broadcast content corresponding to the queries. As discussed above, in some implementations, a measurement engine 358 may determine thresholds dynamically based on baseline query volumes, content frequency, spike length, or any other such feature.

Measurement engine 358 may execute one or more matching or comparison functions, such as a search function, a lookup function, or any other such function. Measurement engine 358 may identify a spiking search query or receive an identification of a search query from a search service and search within an entity database or closed caption database for keywords or entities corresponding to the search query. As discussed above, in some implementations, a measurement engine 358 may search for semantically related keywords or entities that are different from the spiking query but related (e.g. in the same semantic category). Semantic categories and/or interrelationships between keywords or entities may be identified in a semantic dictionary. Once a keyword or entity is identified in the database corresponding to the spiking query, the measurement engine 358 may retrieve an identification of a broadcast time and channel or broadcast stream identification corresponding to the keyword or entity, and identify whether the time is within a particular time period of the search spike. In some implementations, an item of content may be identified as triggering the spike only if the item of content was broadcast within a specified time period (e.g. 5 minutes, 10 minutes, 15 minutes, one hour, or any other such time). The time period may be selected based on frequency of broadcast of the item of content, with shorter periods for more frequent broadcasts; may be selected based on length of the spike, with longer periods for longer search spikes; and/or any combination of these or other information.

In some implementations, a measurement engine 358 may maintain a viewership database 230. Viewership database 230 may comprise any type and form of database, including a data file, flat file, relational database, structured database, etc. for storing identifications of content and/or broadcast channels and time periods and a corresponding set of device identifiers of client devices that initiated queries matched to corresponding data for the content captured by measurement capture device 220 or received from broadcasters 208. Once an item of content is identified as triggering the search spike, device identifiers that transmitted corresponding search requests may be added to the viewership database 230 as associated with the item of content. A measurement engine 358 may count unique device identifiers associated in the database 230 with an item of content to determine an audience measurement for the content. A viewership database 230 may also store confidence scores of matches of each device identifier to an item of content. Confidence scores may be based on the difference between a spike peak level and a baseline search volume, with larger differences corresponding to higher confidence scores; and/or may be based on the frequency of search spikes with more frequent spikes corresponding to lower confidence scores. In some implementations, confidence scores may be based on a distance of a semantic correspondence or relationship between the spiking query and the query transmitted from the device or keyword or entity associated with the item of content. If a spiking query is for a particular football team and is associated with a broadcast of a game including that team, a device transmitting a query for the team name or an image of the team logo may have a higher confidence score compared to a device transmitting a query for "football" generally. As discussed above, in many implementations, an inference may be made that a viewer also viewed a prior or subsequent item of content, and the device identifier of the user's device may be added to the viewership database 230 for entries for said prior and subsequent items of content. Confidence scores for these other items of content may be reduced from the confidence score for the query-triggering item of content according to a prior confidence score adjustment rate and subsequent confidence score adjustment rate, which may be identical or different. The adjustment rate may lower a confidence score by a designated percentage per second or per minute, with a confidence score for an item of content based on the reduced confidence score at the beginning, middle, or end of the item of content. In some implementations, when generating an overall audience count for an item of content, device identifiers having low confidence scores may be removed or excluded from the audience measurement count.

In a similar implementation, the measurement engine may maintain a database or array of content associated with a device identifier, in addition to or instead of a database or array of device identifiers associated with an item of content. Rather than maintaining a list or array of devices identified as being part of the audience for a particular show, the measurement engine may maintain a list or array of shows identified as having been received by a particular device. In some such implementations, the measurement engine may subsequently search through a plurality of arrays associated with devices for a content identifier of an item of content, to determine how many devices were part of the audience. In a similar implementation, the arrays may be provided to a third party, such as a panel provider, for analysis and/or audience measurement.

Figure 4:
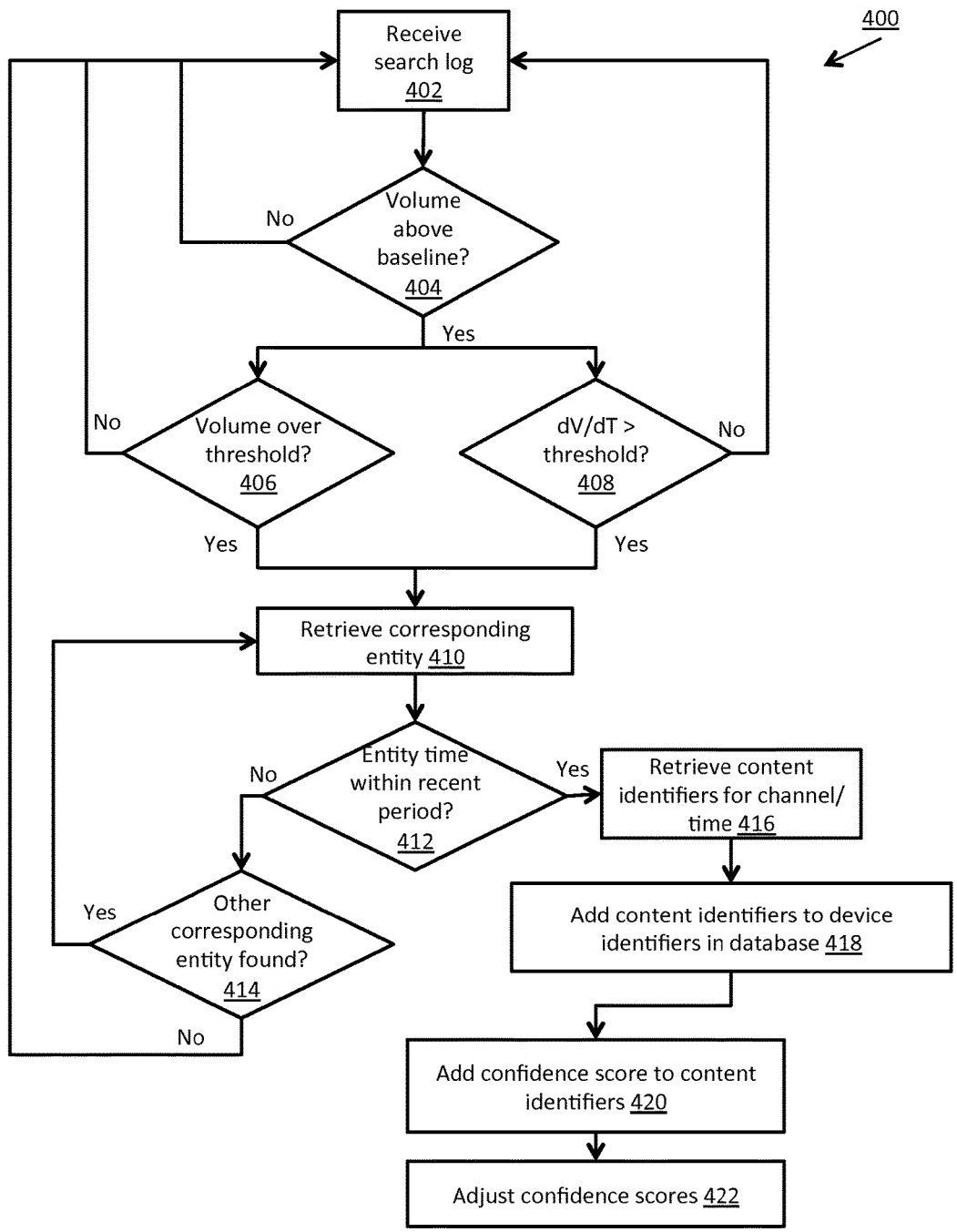
FIG. 4 is a flow diagram of the steps taken in one implementation of a process for identifying audience members of an item of content, according to one implementation.

FIG. 4 is a flow diagram of the steps taken in one implementation of a process 400 for identifying audience members of an item of content. In brief overview, at step 402, an audience measurement server may receive a search log. At step 404, in some implementations, the audience measurement server may determine if a search query volume is above a baseline volume for the query. If the search query volume is not above a baseline volume, step 402 may be repeated. If the search query volume is above a baseline volume, then in some implementations, the audience measurement server may determine if the search query volume is above a spike threshold at step 406, or determine if the search query volume is increasing at a rate dV/dT greater than a threshold at step 408. If the search query volume is neither above a spike threshold nor increasing at a rate greater than a threshold, step 402 may be repeated. If the search query volume or rate is above a threshold, then in some implementations, the audience measurement server may retrieve a corresponding entity or closed caption log entry at step 410. At step 412, the audience measurement server may determine if a broadcast time associated with the entity or caption was within a recent time period. If not, then the audience measurement server may determine whether other corresponding entities or log entries exist at step 414. If other corresponding entities do exist, then steps 410-412 may be repeated.

If the broadcast time associated with the entity or caption was within a recent time period, then at step 416, in some implementations, the audience measurement service may retrieve one or more content identifiers for the channel and time associated with the entity or caption (as well as prior and subsequent times). At step 418, the audience measurement service may add the retrieved content identifiers and device identifiers in the search log to a viewership database. At 420, in some implementations, the audience measurement service may add a confidence score to each device identifier entry for a content identifier. At step 422, the audience measurement service may adjust confidence scores for the device identifier for prior or subsequent content items. In many implementations, one or more of steps 418-422 may be combined.

Still referring to FIG. 4 and in more detail, at step 402 of method 400, an audience measurement server may receive a search log. In some implementations, the audience measurement server may request a search log from a search provider or service, and receive the log in response. In other implementations, the search provider or service may provide the log to the audience measurement server, periodically or continuously. In still other implementations, the search provider may identify spiking search queries and may transmit a log of only the spiking queries to the audience measurement server. In such implementations, steps 404, 406, and/or 408 may be performed by the search server prior to step 402. The search log may be received via any type and form of transfer including a file transfer over a LAN, transfer via a WAN such as the Internet, or by reading the log from a shared storage location with a search service.

At step 404, in some implementations, the audience measurement server may determine if a search query volume is above a baseline volume for the query. In other implementations as discussed above, the search server may determine if a search query volume is above a baseline volume for the query. Determining whether a query volume is above a baseline volume may comprise monitoring a number of search queries over a designated time period, such as a second, minute, ten minutes, or an hour. In implementations utilizing a semantic dictionary, determining whether a query volume is above a baseline volume may comprise monitoring a plurality of related search queries and aggregating the number of requests for any related query over the designated time period. If the search query volume is not above a baseline volume, step 402 may be repeated.

If the search query volume is above a baseline volume, then in some implementations, the audience measurement server (or search service) may determine if the search query volume is above a spike threshold at step 406. As discussed above, a spike threshold may be set dynamically based on a baseline volume, such as twice the baseline volume, three times the baseline volume, ten times the baseline volume, the baseline volume plus one query per second, or any other such amount. Dynamically setting the spike threshold may allow use with both high baseline volume and low baseline volume queries.

If the search query volume is above a baseline volume, then in some implementations, the audience measurement server (or search service) may determine if the search query volume is increasing at a rate dV/dT greater than a threshold at step 408. As discussed above, a spike may be determined based on the rate of increase of the search volume rather than by comparison to a specific volume threshold. Monitoring the rate of increase of a query volume may allow for faster identification of search spikes or identification of very short term spikes.

If the search query volume is neither above a spike threshold nor increasing at a rate greater than a threshold, step 402 may be repeated. If the search query volume or rate is above a threshold, then in some implementations, the audience measurement server may retrieve a corresponding entity or closed caption log entry at step 410. Retrieving a corresponding entity or log entry may include searching an entity database or caption log for entries corresponding to the search query. In some implementations, retrieving a corresponding entity or log entry may include retrieving, from a semantic dictionary, an identification of a category corresponding to a search query and/or one or more additional search queries or entities that are related to the spiking query. The audience measurement service may search the entity database or caption log for any entry corresponding to the category or one or more additional search queries. In other implementations, as discussed above, steps 404-408 may be performed by search provider prior to step 402, and the audience measurement server may receive a log of a spiking query and proceed directly to step 410.

Each entity or caption in a database may be associated with a broadcast service and/or channel and a broadcast time. At step 412, the audience measurement server may determine if the broadcast time associated with the retrieved entity or caption was within a recent time period (e.g. whether the entity was broadcast within a predetermined period of time relative to the search query spike). "Recent" may thus be relative to the search query spike, rather than a present time of execution of method 400 (such as when method 400 is performed on historical search logs). The time period may be determined dynamically based on frequency of broadcast of an item of content associated with the retrieved entity or caption, with more frequently broadcast items (e.g. specific advertisements, syndicated programs, popular songs, etc.) having a shorter time period. The time period may also be determined based on a spike frequency and/or spike length for the query with less frequent or longer spike lengths associated with longer time periods; or may be determined based on the baseline search volume or difference between a peak search volume and a baseline search volume, with larger differences or lower baseline volumes associated with longer time periods. Entities or captions not received within a recent time period may be purged from the database in some implementations. This may help avoid ambiguous results in which a search query matches multiple broadcasts of the same content. If the broadcast time associated with the retrieved entity or caption was not within a recent time period, then the audience measurement server may determine whether other corresponding entities or log entries exist at step 414. If other corresponding entities do exist, then steps 410-412 may be repeated. In some implementations, the audience measurement server may retrieve the most recent matching entity or caption. Accordingly, if the most recent matching entity or caption is outside of the recent time period, then no other corresponding entities may exist. In some implementations, the time period may be expanded to include other entities or captions and corresponding broadcasts of content, but a confidence score of an association with a device transmitting a query and viewership of said content may be correspondingly reduced. In still other implementations, at step 410, an entity may be retrieved via a search within a specified time window. This may allow the system to skip steps 412-414.

If the broadcast time associated with the entity or caption was within a recent time period, then at step 416, in some implementations, the audience measurement service may retrieve a content identifier for the channel and time associated with the retrieved entity or caption. The content identifier may identify a broadcast system (e.g. terrestrial network, satellite network, cable provider, Internet stream or source, etc.) and channel or content stream from the broadcaster, as well as a time at which the entity or caption was detected in the stream. Content identifiers may be retrieved from a programming guide received from a broadcaster or other service, may be determined via metadata, closed captioning, or other data provided with the beginning of an item of content (e.g. a television show intro, a caption identifying a news program, etc.). In some implementations, as discussed above, the audience measurement service may also retrieve content identifiers for the channel at times prior to the time associated with the retrieved entity or caption, and content identifiers for the channel at times subsequent to the time associated with the retrieved entity or caption. In many implementations, the audience measurement service may retrieve content identifiers for such prior or subsequent content that was broadcast within a specified time range of the query-triggering content (e.g. 5 minutes, 10 minutes, or any other such value).

At step 418, the audience measurement service may add the retrieved content identifiers and device identifiers in the search log to a viewership database. As discussed above, in some implementations, a viewership database may include an entry for each item of content, and the audience measurement server may add device identifiers from the spiking query log to the entry. In other implementations, a viewership database may include an entry for each device identifier, and the audience measurement server may add entries for each item of content to the entries of device identifiers that transmitted a query corresponding to the spike.

At 420, in some implementations, the audience measurement service may add a confidence score to each device identifier entry for a content identifier. At step 422, the audience measurement service may adjust confidence scores for the device identifier for prior or subsequent content items. In many implementations, one or more of steps 418-422 may be combined. As discussed above, an association between a device identifier of a device that transmitted a spiking query and an item of content corresponding to the query may be given a confidence score. The confidence score may be a default score, or the confidence score may be based on one or more of: a frequency of spiking queries for the query, with more frequent spikes associated with a lower confidence score that the item of content, rather than a previous item of content, triggered the search query; a frequency of broadcast of the item of content, with frequently broadcast items of content associated with a lower confidence score that the viewer watched that particular broadcast of the item; a length of a search spike, with long spikes potentially indicating a trending topic or word-of-mouth spread of the topic rather than that users triggering queries watched the particular broadcast (e.g. lower confidence score); a difference between a baseline search volume and a peak spike volume with a large difference indicating that a viewer was more likely to have watched the broadcast (e.g. higher confidence score); a baseline search volume with a very low search volume indicating that users triggering searches during the spike were more likely to have watched the item of content; or any other such information. Confidence scores for prior and subsequent items of content may be reduced from the confidence score generated for the query-triggering item of content, in accordance with prior and subsequent confidence adjustment rates. In some implementations, subsequent adjustment rates may be larger (reducing the confidence score by a larger amount) than prior adjustment rates, as viewers may have stopped watching the broadcast stream in order to generate queries.

Figure 5:
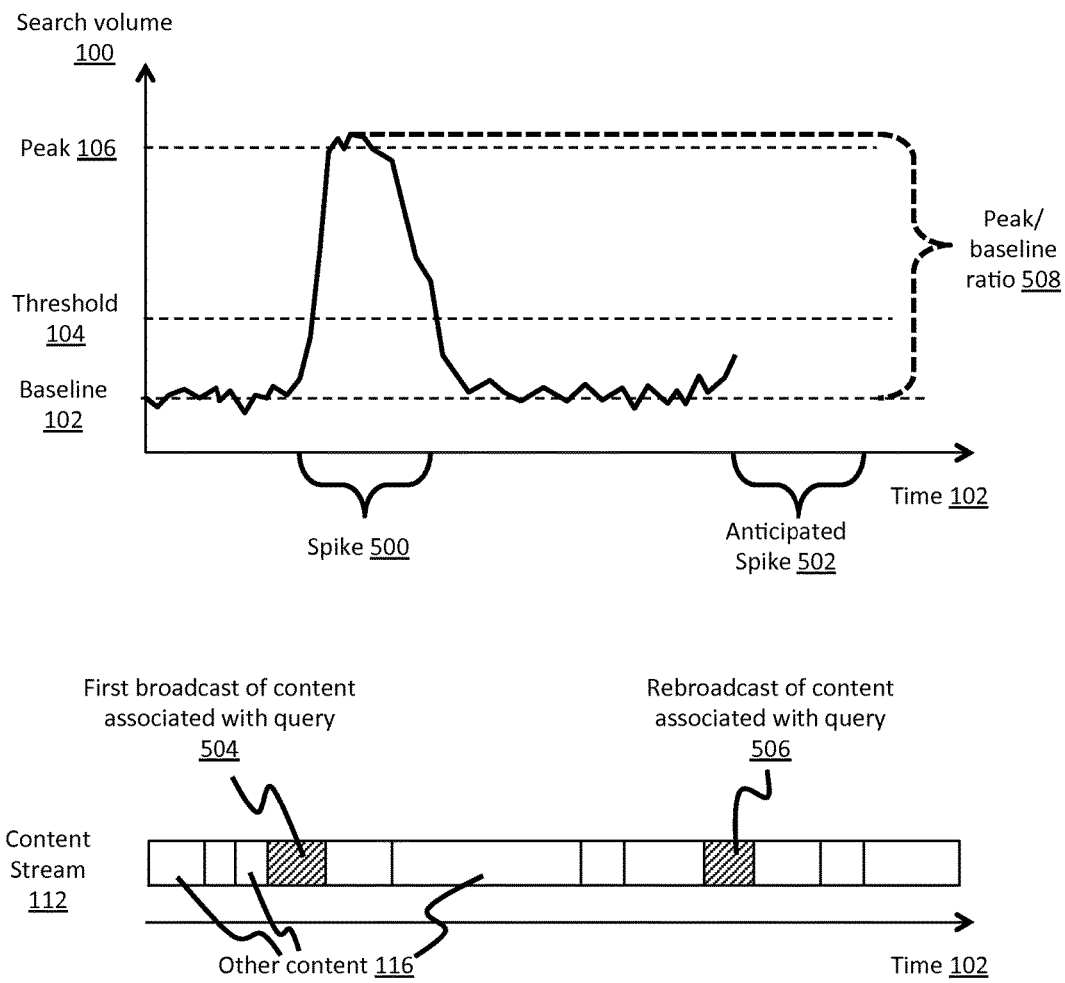
FIG. 5 an illustration of a relationship between a spiking search query and an item of content within a content stream, and a rebroadcast of the item of content and anticipated spiking query, according to one implementation.

Identified spiking queries associated with broadcasts may be leveraged to perform predictive audience measurement and content targeting for future rebroadcasts. In practice, many broadcasts of items of content are re-broadcast at a later time, such as in a geographically separated time zone (e.g. prime time broadcasts to an East coast region and subsequent prime time rebroadcasts to a West coast region); in the same region to increase potential viewership (e.g. identical segments shown in early morning news programs and late morning news programs); or for other similar purposes. If a spiking query is identified as associated with an initial broadcast (e.g. temporally and contextually related to the initial broadcast), then if identical queries are subsequently received in close temporal relation to a rebroadcast, the measurement service may infer that users generating the later queries likely viewed the rebroadcast. FIG. 5 an illustration of a relationship between a spiking search query 500 and an item of content 504 within a content stream 112, and a rebroadcast of the item of content 506 and anticipated spiking query 502, according to one implementation. Similar to FIG. 1 above, FIG. 5 illustrates a sample of search volume 100 over time 102 for a query or set of related queries (e.g. related entities in a semantic dictionary, etc.). As discussed above in connection with FIG. 1, the search volume may be at a baseline rate 102 for a time prior to a broadcast of an item of content 504. Some audience members who watched the broadcast of the item of content 504 may subsequently initiate queries for related information, causing the search volume 100 to rise above a threshold 104 and eventually to a peak 106. Subsequently, when the item of content is rebroadcast 506, a portion of audience members of the rebroadcast may initiate similar queries for related information. These queries may be detected and identified as being part of an anticipated query spike 502. This inference can be made even before a rate of queries passes a surge threshold 104 during or after the rebroadcast 506, allowing almost immediate identification of likely audience members. Furthermore, additional content (e.g. advertising, special features, etc.) related to the rebroadcast may be presented to the users, with a high confidence that the additional content will be relevant and well received, with a corresponding increase in offer acceptance or click-through rates.

In a further implementation, a peak/baseline ratio 508 or confidence score, as discussed above, may be used to select whether additional content is presented to the potential audience members of the rebroadcast item of content 506. Additional content related to the rebroadcast item of content may be delivered to n % of devices transmitting queries related to the anticipated spike 502, with n proportional to the peak/baseline ratio 508 (e.g. [peak rate−baseline rate]/[peak rate+baseline rate] in one implementation; a factor proportional to this, such as the square root of the peak/baseline ratio in another implementation; etc.). This may provide adequate coverage of the potential audience members while reducing the amount of irrelevant additional content offered to non-audience members.

Figure 6:
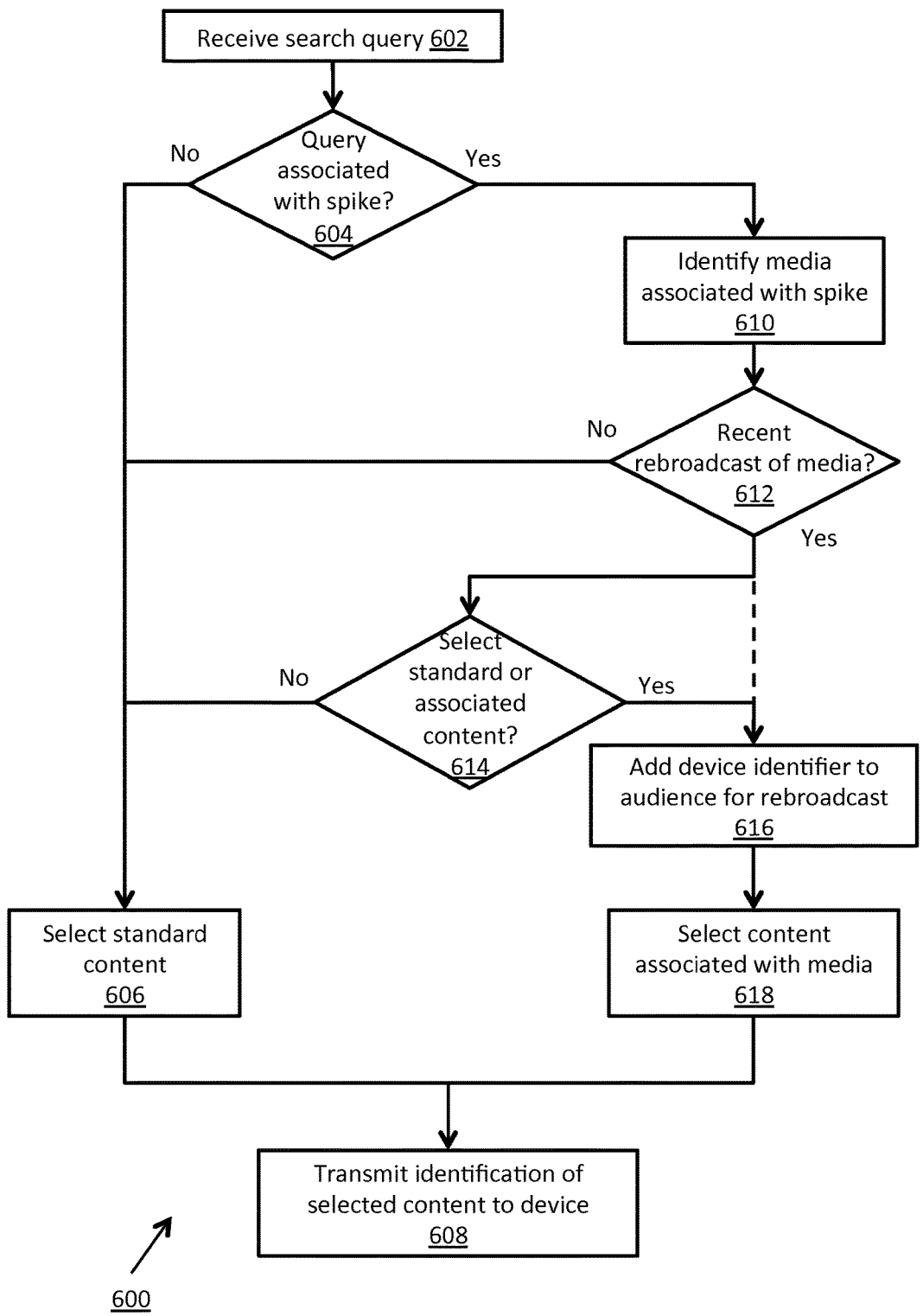
FIG. 6 is a flow diagram of the steps taken in one implementation of a process for content selection based on search query correlation with broadcast media.

FIG. 6 is a flow diagram of the steps taken in one implementation of a process 600 for content selection based on search query correlation with broadcast media. At step 602, a search provider server or device may receive a search query from a client device operating on behalf of a user or potential audience member. The search query may comprise one or more keywords, search terms, pictures, spoken word queries, or other entities, and may be received in an application layer payload of a packet, such as an HTTP packet, or in any other type and form of request.

At step 604, the search provider server may determine whether the received search query is associated with a previous spiking query. In some implementations, the server may determine whether the query has previously been identified as a spiking query, as discussed above in connection with FIG. 4. In other implementations, determining whether the received search query is associated with a previous spiking query may comprise identifying, from a semantic dictionary, a category or classification of the keyword or entity or one or more related keywords or entities and identifying whether the category, classification, or related keywords and/or entities have previously been identified as a spiking query. In some implementations, the search provider may maintain a log of identified spiking queries for a period of time, such as three hours, six hours, one day, or any other such period of time. In some implementations in which content is broadcast to the East coast of the U.S. and rebroadcast up to three hours later to the West coast of the U.S., spiking query logs may be maintained for three hours, or a similarly appropriate amount of time (or four or five hours to allow for hysteresis of query spikes). In other implementations, spiking query logs may be maintained for longer periods, such as in instances in which weekend news content is broadcast on Saturday morning and rebroadcast on Sunday morning to increase the potential audience. Determining whether the received search query is associated with a previous spiking query may comprise searching for a corresponding query or category over the time period maintained in the log.

If the search provider determines that the received search query is not associated with any spiking query (or any spiking query within the time period maintained in a log), then at step 606, the search provider may select standard content to be provided to the client device. Standard content may be typical results to the search query, or may be advertisements, offers, or additional content transmitted with results of the search query and displayed by the client along with search results. In instances in which the search query is for audio or video data, the additional content may include interstitial advertising, pre-roll or post-roll advertising, banner advertising, text advertising, offers to purchase additional content, or any other type and form of additional data. At step 608, an identification of the selected content may be transmitted to the client device. The identification may include addresses, such as uniform resource locators (URLs) or uniform resource identifiers (URIs), server addresses or storage locations, text or alphanumeric strings, images, executable code, or any other type and form of data. The identification may be transmitted with search results for the received query, in many implementations. Although discussed in terms of a search provider, in many implementations, steps 604, 606, and/or 608 may be performed by a content selection server executed by the same or another computing device, and may be performed in response to a request for an item of content by the search provider. In such implementations, the search provider may receive a query from a client device at step 602 and transmit a corresponding request for content to the content provider, the request including the search query or an identification of a corresponding spiking query. The content provider may then perform one or more of steps 604-608 as necessary, as well as any of steps 610-616 discussed below.

If the received query is determined to be associated with a previously spiking query at step 604, then at step 610, the search provider server may identify an item of content or broadcast media associated with the spiking query. Identifying the broadcast media associated with the query may comprise identifying an item of media in a log associated with the query, reviewing a broadcast schedule or timeline, or otherwise identifying media broadcast temporally related to (e.g. at or shortly before the query spike) and contextually related to the spiking query. As discussed above, the search provider may determine whether the query is contextually related to the media by retrieving, from a semantic dictionary, an identification of a category corresponding to a search query and/or one or more additional search queries or entities that are related to the spiking query; and searching an entity database or caption log for any entry corresponding to the category or one or more additional search queries. In many implementations, the identification may be performed by an audience measurement service and the identified item of media associated with the spiking query in a log provided to the search provider.

Once the item of content or broadcast media associated with the earlier spiking query is identified, at step 612, the search provider may determine whether there has been a recent rebroadcast of the item of content or media. Determining whether there has been a recent rebroadcast of the item of content or media may include reviewing one or more broadcast schedules, searching a log or database of broadcast content, receiving an identification of rebroadcast content or media from a broadcaster, measurement system, or measurement service capture device, or any other such methods. A recent rebroadcast may be a rebroadcast that has recently started and is still underway or recently completed, with "recent" including a predetermined range of time to provide hysteresis for queries. In some implementations, a rebroadcast of the item of content or media may be considered recent if it started or completed within the previous 10 minutes, half hour, hour, two hours, etc., or any other such time period. In many implementations, the time period may be dynamically adjusted based on the length of the content, such as a time period t equal to n times the length of the rebroadcast content 1. In a further implementation, minimum and/or maximum thresholds may be set for the time period (e.g. min(5 minutes, [t=n*l]), to constrain search times for very long or very short items of content.

If the search provider determines that there has been no recent rebroadcast of corresponding media at step 612, then the system may infer that the search request was likely not triggered as a result of the broadcast or rebroadcast, and rather represents a typical or baseline query. Accordingly, the search provider may select a standard item of additional content at step 606 and transmit an identification of the selected content to the client device at step 608, as discussed above.

If the search provider determines that there has been a recent rebroadcast of media at step 612, then in some implementations, the search provider may make a statistical estimation of whether the user of the client device was an audience member for the rebroadcast, based on a confidence score for the earlier query spike. As discussed above in connection with confidence score 118 of FIG. 1 and peak/baseline ratio 508 of FIG. 5, a confidence score may be based on a difference between a peak search volume or rate 106 and a baseline search volume or rate 102. The search provider may select to deliver standard content or media-related content based on the ratio between the peak and baseline volumes, such as delivering media-related to content to [(peak−baseline)/(peak+baseline)] percent of client devices. In other implementations, to enhance the likelihood of successfully reaching audience members of the rebroadcast, the selection percentage may be increased (e.g. sqrt [(peak−baseline)/(peak+baseline)]; [(peak−baseline+adjustment factor)/(peak+baseline)]; min(m %, [(peak−baseline)/(peak+baseline)]); or any other such method). If the search provider estimates that the user of the client device was not an audience member and/or selects to deliver standard content, then the search provider may select standard content at step 606 and transmit an identification of the selected content to the device at step 608, as discussed above. In some implementations, step 614 may be skipped as shown (dashed line), with media-related content provided to all devices that transmitted a spike-related query in the recent time period after a rebroadcast. This may be done to ensure that all audience members are targeted.

If the search provider estimates that the user of the client device was an audience member of the rebroadcast and/or selects to deliver content associated with the media at step 614, then at step 616, in some implementations, the search provider and/or an audience measurement server may add an identifier of the client device and/or a user of the client device to an audience log for the rebroadcast of the item of media. In many implementations, the search provider may transmit a request to the audience measurement service including the identifier of the client device and an identification of the rebroadcast media. In other implementations, step 616 may be skipped.

At step 618, the search provider may select an additional item of content associated with the rebroadcast item of content or media. The additional item of content may be associated with the media in a database, such as an advertising campaign database or other such index, providing a set of one or more items of content related to the media to be selected for presentation to client devices. As discussed above, the additional items of content may be media-related advertising, offers, special features, or any other type and form of data that may be targeted to audience members of the rebroadcast media. The search provider may transmit an identification of the selected content associated with the rebroadcast media to the client device at step 608, as discussed above.

As discussed above, the method 600 and systems discussed herein allow targeting and presentation of additional content to even the initial audience members of a rebroadcast that transmit media-related search queries, long before a query spike for the rebroadcast may be detected. Such initial audience members may also be the most enthusiastic regarding the media, and thus the best targets to reach with media-related targeted content.

In some implementations, users initiating queries may be provided with an opportunity to control whether or how to transmit measurement data to the audience measurement server. Thus, the user may have control over how information is collected about him or her and used by the audience measurement servers and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for content selection based on search query correlation with broadcast media, comprising:
    receiving, by a content selection server from a client device at a first time period associated with a rebroadcast of an item of media, a request for an item of content, the request identifying a search query;
    determining, by the content selection server from a first log obtained from a search provider, a first plurality of search requests for related entities of the item of media from a first plurality of client devices including the client device during the first time period;
    determining, by the content selection server from a second log obtained from the search provider, that a rate of receipt of a second plurality of search requests for the related entities of the item of media from a second plurality of client devices during a second time period associated with an earlier broadcast of the item of media exceeded a threshold;
    calculating, by the content selection server, from the second log obtained from the search provider, a difference between the rate of receipt of the second plurality of search requests for the related entities of the item of media during the second time period and a baseline rate of receipt of requests for the related entities of the item of media;
    determining, by the content selection server, a confidence score for an association of the related entities of the item of media to the item of media based on the calculated difference; and
    transmitting the item of content, by the content selection server, to a percentage of the first plurality of client devices proportional to the determined confidence score, including the client device, responsive to (i) the determination that the rate of receipt of the second plurality of search requests for the related entities of the item of media from the second plurality of client devices during the second time period associated with the earlier broadcast of the item of media exceeded the threshold, and (ii) the determination of the first plurality of search requests for related entities of the item of media from the first plurality of client devices including the client device during the first time period associated with the rebroadcast.

2. The method of claim 1, wherein the threshold is a multiple of a baseline rate of receipt for the search requests for related entities of the item of media.

3. The method of claim 1, wherein determining that the rate of receipt of the search requests for related entities of the item of media from the second plurality of client devices during the second time period exceeded the threshold further comprises determining that the rate of receipt of the search requests for related entities of the item of media during the second time period exceeded an average rate of receipt for the search requests for related entities of the item of media by at least a second threshold.

4. The method of claim 1, wherein the request comprises an entity associated with the search query in a semantic dictionary.

5. The method of claim 1, wherein determining the confidence score is further based on a difference between a peak rate of receipt of the search requests for related entities of the item of media query by the search provider during the second time period and a baseline rate of receipt of the search requests for related entities of the item of media.

6. The method of claim 1, wherein transmitting the item of content to the percentage of the first plurality of client devices proportional to the determined confidence score further comprises selecting the item of content from an index of items of content associated with the item of media, responsive to an identification that users of the first plurality of client devices are likely audience members of the rebroadcast of the item of media.

7. A method for content selection based on search query correlation with broadcast media, comprising:
    receiving, by a search provider from a plurality of client devices during a first time period associated with a broadcast of an item of media, a plurality of search requests for related entities of the item of media;
    determining, by the search provider, that a rate of receipt of the search requests for the related entities of the item of media during the first time period exceeds a threshold;
    calculating, by the search provider, a difference between the rate of receipt of the search requests for the related entities of the item of media during the first time period and a baseline rate of receipt of search requests for the related entities of the item of media;
    determining, by the search provider, a confidence score for an association of the related entities of the item of media to the item of media based on the calculated difference;

receiving, by the search provider from a second plurality of client devices during a second time period associated with a rebroadcast of the item of media, a corresponding second plurality of search requests for at least one of the related entities of the item of media; and directing a content selection server to provide an item of content to a percentage of the second plurality of client devices proportional to the determined confidence score, by the search provider, responsive to (i) the determination that the rate of receipt of the search requests for the related entities of the item of media during the first time period associated with the broadcast exceeded the threshold, and (ii) receiving the corresponding second plurality of search requests from the second plurality of client devices during the second time period associated with the rebroadcast.

8. The method of claim 7, further comprising receiving, by the content selection server prior to the second time period, an identification of one or more items of content to be associated with the item of media.

9. The method of claim 7, further comprising dynamically determining, by the search provider, the threshold as a multiple of a baseline rate of receipt of search requests for the related entities of the item of media.

10. The method of claim 7, wherein the related entities of the item of media are associated in a semantic dictionary.

11. A system for content selection based on search query correlation with broadcast media comprising:

a content selection server executed by a computing device configured for:

receiving, from a plurality of client devices at a first time period associated with a rebroadcast of an item of media, a plurality of requests for an item of content, determining, from a first log obtained from a search provider, a first plurality of search queries for related entities of the item of media from a second plurality of client devices during the first time period, determining, from a second log obtained from the search provider, that a rate of receipt of a second plurality of search queries for the related entities of the item of media from a third plurality of client devices during a second time period associated with an earlier broadcast of the item of media exceeded a threshold, calculating, from the second log obtained from the search provider, a difference between the rate of receipt of the second plurality of the search queries during the second time period and a baseline rate of receipt of search queries for the related entities of the item of media, determining a confidence score for an association of the related entities of the item of media to the item of media based on the calculated difference, and transmitting the item of content to a percentage of the first plurality of client devices proportional to the determined confidence score responsive to (i) the determination that the rate of receipt of the second plurality of search queries during the second time period associated with the earlier broadcast of the item of media exceeded the threshold, and (ii) the determination of the first plurality of search queries for related entities of the item of media from the second plurality of client devices during the first time period associated with the rebroadcast.

12. The system of claim 11, wherein the threshold is a multiple of a baseline rate of receipt of search queries for the related entities of the item of media.

13. The system of claim 11, wherein the content selection server is further configured for determining that the rate of receipt of the second plurality of search queries-during the second time period exceeded an average rate of receipt of search queries for the related entities of the item of media by at least a second threshold.

14. The system of claim 11, wherein the plurality of requests comprises an entity associated with the first plurality of search queries in a semantic dictionary.

15. The system of claim 11, wherein determining the confidence score is further based on a difference between a peak rate of receipt of search queries for the related entities of the item of media during the second time period and a baseline rate of receipt of search queries for the related entities of the item of media.

16. The system of claim 11, wherein the content selection server is further configured for selecting the item of content from an index of items of content associated with the item of media, responsive to the identification that users of the first plurality of client devices are likely audience members of the rebroadcast of the item of media.

* * * * *